(12) United States Patent
Wu

(10) Patent No.: US 12,132,573 B2
(45) Date of Patent: Oct. 29, 2024

(54) COMMUNICATION METHOD BASED ON DELAY REQUIREMENT, DEVICE AND STORAGE MEDIUM

(71) Applicant: GUANGDONG OPPO MOBILE TELECOMMUNICATIONS CORP., LTD., Guangdong (CN)

(72) Inventor: Zuomin Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 338 days.

(21) Appl. No.: 17/734,543

(22) Filed: May 2, 2022

(65) Prior Publication Data

US 2022/0271870 A1 Aug. 25, 2022

Related U.S. Application Data

(63) Continuation of application No. PCT/CN2020/074891, filed on Feb. 12, 2020.

(51) Int. Cl.
*H04L 1/1812* (2023.01)
*H04L 1/1607* (2023.01)
*H04W 72/23* (2023.01)

(52) U.S. Cl.
CPC .......... *H04L 1/1812* (2013.01); *H04L 1/1671* (2013.01); *H04W 72/23* (2023.01)

(58) Field of Classification Search
None
See application file for complete search history.

(56) References Cited

U.S. PATENT DOCUMENTS

2020/0366415 A1* 11/2020 Khoshnevisan ...... H04W 16/14
2022/0224457 A1* 7/2022 Ebrahim Rezagah ......................
H04L 1/1812
2023/0043604 A1* 2/2023 Lee ................... H04W 72/0446

FOREIGN PATENT DOCUMENTS

CN 1748435 A 3/2006
CN 104412531 A 3/2015
(Continued)

OTHER PUBLICATIONS

ITRI, Remaining issues of HARQ enhancements for NR-U,R1-1912858,3GPP TSG RAN WG1 #99, Reno, USA, Nov. 18-22, 2019.
(Continued)

*Primary Examiner* — Jamaal Henson
(74) *Attorney, Agent, or Firm* — Ladas & Parry LLP

(57) ABSTRACT

Embodiments of the present application provide a communication method, a device and a storage medium. A network device instructs a terminal device to feed back a target HARQ-ACK codebook by carrying one-shot HARQ-ACK request information used to instruct the terminal device to perform uplink feedback in DCI, the terminal device transmits the target HARQ-ACK codebook to the network device through a target uplink channel after a delay requirement is met; or, when the delay requirement is not met, the terminal device does not transmit the target uplink channel, or the terminal device transmits the target uplink channel to the network device, but the target uplink channel does not include a valid target HARQ-ACK codebook. Through the method, processing delays when the DCI schedules a PDSCH and does not schedule a PDSCH can be determined, thus ensuring transmission of the one-shot HARQ-ACK information.

7 Claims, 5 Drawing Sheets

(56) References Cited

FOREIGN PATENT DOCUMENTS

| CN | 106376050 A | 2/2017 |
|---|---|---|
| CN | 108811094 A | 11/2018 |
| CN | 110474737 A | 11/2019 |
| CN | 110708146 A | 1/2021 |

OTHER PUBLICATIONS

Huawei, Feature lead summary of HARQ enhancements for NR-U, R1-1909496, 3GPP TSG RAN WG1 Meeting #98 Prague, Czech Republic, Aug. 26-30, 2019.

The EESR of corresponding European application No. 20916215.3, dated Sep. 22, 2022.

The EESR of corresponding European application No. 23187323.3 dated Nov. 7, 2023.

The Notice of Allowance of corresponding Chinese application No. 202210442399.3, dated Aug. 4, 2023.

International Search Report (ISR) dated Oct. 30, 2020 for Application No. PCT/CN2020/074891.

Qualcomm Incorporated: 'Enhancements to Scheduling and HARQ operation for NR-U' 3GPP TSG RAN WG1 Meeting #95 R1-183415 Nov. 3. 2018.

Qualcomm Incorporated: 'Enhancements to Scheduling and HARQ operation for NR-U' 3GPP TSG RAN WG1 Meeting #94bis R1-1811254 Sep. 29, 2018.

Qualcomm Incorporated: 'Enhancements to Scheduling and HARQ operation for NR-U' 3GPP TSG RAN WG1 Meeting #94 R1-1809481 Aug. 17, 2018.

Qualcomm Incorporated: 'Enhancements to Scheduling and HARQ operation for NR-U' 3GPP TSG RAN WG1 Meeting #93 R1-1807391 May 12, 2018.

The first Office Action of corresponding Chinese application No. 202210442399.3, dated May 22, 2023.

* cited by examiner

COMMUNICATION METHOD BASED ON DELAY REQUIREMENT, DEVICE AND STORAGE MEDIUM

CROSS-REFERENCE TO RELATED APPLICATION

This application is a continuation of International Application No. PCT/CN2020/074891, filed on Feb. 12, 2020, the content of which is incorporated herein by reference in its entirety.

TECHNICAL FIELD

Embodiments of the present application relate to communication technology, in particular, to a communication method, a device and a storage medium.

BACKGROUND

In an existing communication system, a new feedback mode of a hybrid automatic repeat-request-acknowledgement (HARQ-ACK) codebook is introduced: one-shot hybrid automatic repeat-request-acknowledgement (one-shot HARQ-ACK) feedback. The one-shot HARQ-ACK feedback is used to feed back HARQ-ACK information of all HARQ processes on a configured carrier in a physical uplink control channel (PUCCH) group.

A network side device configures the one-shot HARQ-ACK feedback for a terminal device, and instructs the terminal device whether to perform the one-shot HARQ-ACK feedback through downlink control information (DCI). If the terminal device is configured with the one-shot HARQ-ACK feedback, corresponding DCI may include a one-shot HARQ-ACK feedback request information field. The terminal device determines whether to perform the one-shot HARQ-ACK feedback according to an indication of the one-shot HARQ-ACK feedback request information field in the received DCI. The DCI may be downlink grant information.

When the one-shot HARQ-ACK feedback is triggered for the terminal device, how can the terminal device effectively perform a corresponding HARQ-ACK codebook feedback is a problem to be considered.

SUMMARY

Embodiments of the present application provide a communication method, a device and a storage medium. When DCI schedules a physical downlink shared channel (PDSCH) or does not schedule a PDSCH, a processing delay of a uplink channel that feeds back one-shot HARQ-ACK information can be determined, or feasibility of feeding back the one-shot HARQ-ACK information on the uplink channel can be determined, so as to ensure transmission of the one-shot HARQ-ACK information.

In a first aspect, an embodiment of the present application may provide a communication method, including:
  receiving, by a terminal device, downlink control information DCI transmitted by a network device, where the DCI includes one-shot hybrid automatic repeat-request-acknowledgement one-shot HARQ-ACK request information, the one-shot HARQ-ACK request information is used to instruct the terminal device to feed back a target HARQ-ACK codebook through a target uplink channel, and the DCI includes scheduling information of the terminal device;
  transmitting, by the terminal device, the target HARQ-ACK codebook to the network device through the target uplink channel after a delay requirement is met; or,
  when a delay requirement is not met, not transmitting, by the terminal device, the target uplink channel, or transmitting, by the terminal device, to the network device the target uplink channel which does not include a valid target HARQ-ACK codebook, or, transmitting, by the terminal device, the target HARQ-ACK codebook to the network device through the target uplink channel, where the target HARQ-ACK codebook includes at least part of invalid information.

In a second aspect, an embodiment of the present application may provide a communication method, including:
  transmitting, by a network device, downlink control information DCI to a terminal device, where the DCI includes one-shot hybrid automatic repeat-request-acknowledgement one-shot HARQ-ACK request information, the one-shot HARQ-ACK request information is used to instruct the terminal device to feed back a target HARQ-ACK codebook through a target uplink channel, and the DCI includes scheduling information of the terminal device;
  receiving, by the network device, the target HARQ-ACK codebook transmitted by the terminal device through the target uplink channel when the target uplink channel meets a delay requirement; or,
  when the target uplink channel does not meet a delay requirement, determining, by the network device, not to receive the target uplink channel, or receiving, by the network 1 device, the target uplink channel which does not include a valid target HARQ-ACK codebook, or, receiving, by the network device, the target HARQ-ACK codebook transmitted by the terminal device through the target uplink channel, and determining valid information and/or invalid information in the target HARQ-ACK codebook according to the delay requirement.

In a third aspect, an embodiment of the present application may provide a terminal device, including:
  a receiving module, configured to receive downlink control information DCI transmitted by a network device, where the DCI includes one-shot hybrid automatic repeat-request-acknowledgement one-shot HARQ-ACK request information, the one-shot HARQ-ACK request information is used to instruct the terminal device to feed back a target HARQ-ACK codebook through a target uplink channel, and the DCI includes scheduling information of the terminal device;
  a transmitting module configured to transmit the target HARQ-ACK codebook to the network device through the target uplink channel after a delay requirement is met; or, transmit the target uplink channel to the network device when a delay requirement is not met, where the target uplink channel does not include a valid target HARQ-ACK codebook, or, transmit the target HARQ-ACK codebook to the network device through the target uplink channel when a delay requirement is not met, where the target HARQ-ACK codebook includes at least part of invalid information; or,
  a determining module, configured to determine not to transmit the target uplink channel when a delay requirement is not met.

In a fourth aspect, an embodiment of the present application may provide a network device, including:
- a transmitting module, configured to transmit downlink control information DCI to the terminal device, where the DCI includes one-shot hybrid automatic repeat-request-acknowledgement one-shot HARQ-ACK request information, the one-shot HARQ-ACK request information is used to instruct the terminal device to feed back a target HARQ-ACK codebook through a target uplink channel, and the DCI includes scheduling information of the terminal device;
- a receiving module, configured to receive the target HARQ-ACK codebook transmitted by the terminal device through the target uplink channel when the target uplink channel meets a delay requirement, or receive the target uplink channel when the target uplink channel does not meet a delay requirement, where the target uplink channel does not include a valid target HARQ-ACK codebook, or, receive the target HARQ-ACK codebook transmitted by the terminal device through the target uplink channel when the target uplink channel does not meet a delay requirement, where the target HARQ-ACK codebook includes at least part of invalid information; or,
- a determining module, configured to determine not to receive the target uplink channel when the target uplink channel does not meet a delay requirement, or determine valid information and/or invalid information in the target HARQ-ACK codebook according to the delay requirement.

In a fifth aspect, an embodiment of the present application may provide a terminal device, including:
- a processor, a memory and an interface for communication with other devices;
- the memory stores a computer execution instruction;
- the processor executes the computer execution instruction stored in the memory to enable the processor to execute the communication method as described in the first aspect.

In a sixth aspect, an embodiment of the present application may provide a network device, including:
- a processor, a memory and an interface for communication with other devices;
- the memory stores a computer execution instruction;
- the processor executes the computer execution instruction stored in the memory to enable the processor to execute the communication method as described in the second aspect.

In a seventh aspect, an embodiment of the present application may provide a computer-readable storage medium, where a computer execution instruction is stored in the computer-readable storage medium, the communication method as described in the first aspect is implemented when the computer execution instruction is executed by a processor.

In an eighth aspect, an embodiment of the present application may provide a computer-readable storage medium, where a computer execution instruction is stored in the computer-readable storage medium, the communication method as described in the second aspect is implemented when the computer execution instruction is executed by a processor.

In a ninth aspect, an embodiment of the present application provides a program for executing the communication method described in the first aspect when the program is executed by a processor.

In a tenth aspect, an embodiment of the present application provides a program for executing the communication method described in the second aspect when the program is executed by a processor.

In an eleventh aspect, an embodiment of the present application provides a computer program product, including a program instruction, and the program instruction is used to implement the communication method described in the first aspect.

In a twelfth aspect, an embodiment of the present application provides a computer program product, including a program instruction, and the program instruction is used to implement the communication method described in the second aspect.

In a thirteenth aspect, an embodiment of the present application provides a chip, including a processing module and a communication interface, where the processing module can execute the communication method described in the first aspect.

Further, the chip also includes a storage module (e.g., a memory), the storage module is configured to store an instruction, the processing module is configured to execute the instruction stored in the storage module, and an execution of the instruction stored in the storage module causes the processing module to execute the communication method described in the first aspect.

In a fourteenth aspect, an embodiment of the present application provides a chip, including a processing module and a communication interface, where the processing module can execute the communication method described in the second aspect.

Further, the chip also includes a storage module (e.g., a memory), the storage module is configured to store an instruction, the processing module is configured to execute the instruction stored in the storage module, and an execution of the instruction stored in the storage module causes the processing module to execute the communication method described in the second aspect.

According to the communication method provided by the embodiments of the present application, a network device instructs a terminal device to feed back a target HARQ-ACK codebook by carrying one-shot HARQ-ACK request information for instructing the terminal device to perform uplink feedback in DCI, and the terminal device transmits the target HARQ-ACK codebook to the network device through a target uplink channel after a delay requirement is met; or, when a delay requirement is not met, the terminal device does not transmit the target uplink channel or the terminal device transmits to the network device the target uplink channel which does not include a valid target HARQ-ACK codebook, or, the terminal device transmits the target HARQ-ACK codebook to the network device through the target uplink channel, the target HARQ-ACK codebook including at least part of invalid information. Through the method, processing delays of a one-shot HARQ-ACK information feedback (or processing delays of an uplink target channel used to feed back one-shot HARQ-ACK information) can be determined when the DCI schedules a PDSCH and does not schedule a PDSCH, so as to ensure accurate transmission of the one-shot HARQ-ACK information.

BRIEF DESCRIPTION OF DRAWINGS

The accompanying drawings herein are incorporated into the specification and constitute a part of the specification, illustrate embodiments consistent with the present application, and are used to explain principles of the present application together with the specification.

Figure 1:
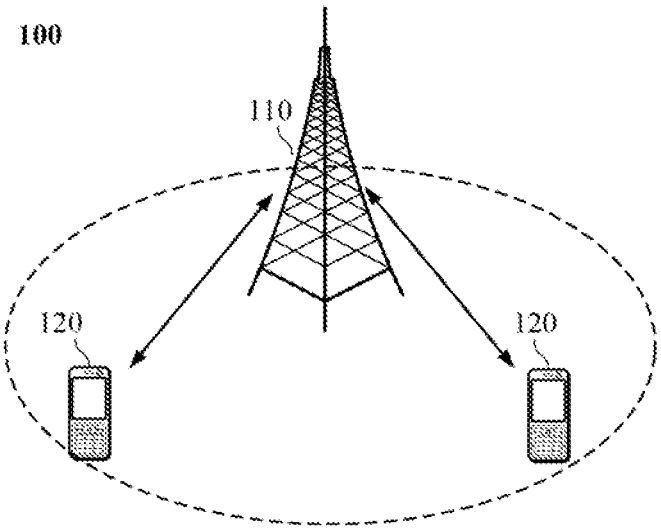
FIG. 1 is a schematic diagram of a communication system applicable to the present application.

Through the above drawings, clear embodiments of the present application have been shown, which will be described in more detail after. These drawings and textual descriptions are not intended to limit the scope of the concept of the present application in any way, but to illustrate the concept of the present application to those skilled in the art by referring to specific embodiments.

DESCRIPTION OF EMBODIMENTS

In order to make purposes, technical solutions and advantages of embodiments of the present application clearer, technical solutions in the embodiments of the present application will be described clearly and completely below in combination with drawings in the embodiments of the present application. Obviously, the described embodiments are part of the embodiments of the present application, not all of the embodiments. Based on the embodiments in the present application, all other embodiments obtained by those of ordinary skill in the art without paying creative efforts belong to the protection scope of the present application.

The terms "first" and "second" in the specification, claims and the above drawings of the embodiments of the present application are used to distinguish similar objects, and are not necessarily used to describe a specific order or sequence. It should be understood that the data so used may be interchanged under appropriate circumstances so that the embodiments of the present application described herein can be implemented, for example, in an order other than those illustrated or described herein. In addition, the terms "comprise" and "have" and any variations thereof are intended to cover non-exclusive inclusion. For example, a process, a method, a system, a product or a device including a series of steps or units is not necessarily limited to those steps or units expressly listed, but may include other steps or units not expressly listed or inherent to the process, method, product or device.

The present application provides an information transmission method, the method can be applied to various communication systems, such as a global system of mobile communication (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, an advanced long term evolution (LTE-A) system, a new radio (NR) system, an evolution system of NR system, an LTE-based access to unlicensed spectrum (LTE-U) system, an NR-based access to unlicensed spectrum (NR-U) system, an universal mobile telecommunications system (UMTS), a worldwide interoperability for microwave access (WiMAX) communication system, a wireless local area network (WLAN), a wireless fidelity (WiFi), a next generation communication system or other communication systems.

In an implementation, the NR system may also be called a 5G system or 5G network.

Generally speaking, traditional communication systems support a limited number of connections and are easy to be implemented. However, with development of communication technology, a mobile communication system will not only supports traditional communication, but also support, for example, device to device (D2D) communication, machine to machine (M2M) communication, machine type communication (MTC) and vehicle to vehicle (V2V) communication, etc., the embodiments of the present application may also be applied to these communication systems.

FIG. 1 is a schematic diagram of a communication system applicable to the present application. In the communication system shown in FIG. 1, taking the communication system 100 including one network device 110 and two terminal devices 120 as an example for description, it should be understood that the communication system 100 may include multiple network devices, and a coverage of each network device may include other numbers of terminal devices, which is not limited in the embodiments of the present application.

The network device 110 may be a device that communicates with the terminal device 120 (or referred to as a communication terminal, a terminal). The network device 110 may provide a communication coverage for a specific geographical area and may communicate with terminal devices located within a coverage area.

In an implementation, the network device 110 may be a base station (Base Transceiver Station, BTS) in a GSM system or a CDMA system, a base station (NodeB, NB) in a WCDMA system, an evolved base station (Evolutional Node B, eNB or eNodeB) in an LTE system, or a wireless controller in a cloud radio access network (CRAN), or the network device may be a mobile switching center, a relay station, an access point, an on-board device, a wearable device, a hub, a switch, a bridge, a router, a network side device in a 5G network, or a network device in a future evolved public land mobile network (PLMN), etc.

When the communication system is the NR system, the network device 110 may be a (radio) access network ((R) AN) device in the NR system, and the (R)AN device in the NR system may be a non-3GPP access network, such as an access point (AP) of a WiFi network, and a next-generation base station (which may be collectively referred to as an NG-RAN node, where the next-generation base station includes a new radio base station (NR nodeB, gNB), a new generation evolved base station (NG-eNB), a gNB in a form of separation of a central unit (CU) and a distributed unit (DU)), a new radio controller (NR controller), a radio frequency remote module, a micro base station, a relay, a transmission receive point (TRP), a transmission point (TP) or other nodes.

The embodiments of the present application do not limit specific technology and specific device forms adopted by the network device. For convenience of description, in all embodiments of the present application, above apparatuses providing wireless communication functions for the terminal device are collectively referred to as a network device.

In the embodiments of the present application, the terminal device 120 may be any terminal. For example, the terminal device 120 may be a user device of machine type communication. The terminal device 120 may also be referred to as a user equipment (UE), a mobile station (MS), a mobile terminal, a terminal, etc.

The terminal device 120 may communicate with one or more core networks via RAN. Therefore, the terminal device 120 may also be referred to as a wireless terminal. The wireless terminal may be a device that provides voice and/or data connectivity to a user, a handheld device with a wireless connection function, or other processing devices connected to a wireless modem.

For example, the terminal device 120 may be a cellular phone, a cordless phone, a session initiation protocol (SIP) phone, a wireless local loop (WLL) station, a personal digital assistant (PDA), a handheld device with a wireless communication function, a computing device or other processing devices connected to a wireless modem, an in-vehicle device or a wearable device, a virtual reality (VR) terminal device, an augmented reality (AR) terminal device, a wireless terminal in industrial control, a wireless terminal in self driving, a wireless terminal in remote medicine, a wireless terminal in smart grid, a wireless terminal in transportation safety, a wireless terminal in smart city, a wireless terminal in smart home, etc. There is no specific limitation in the embodiments of the present application.

As another example, the terminal device 120 includes but is not limited to devices connected via a wired line, such as a device connected via a public switched telephone network (PSTN), a digital subscriber line (DSL), a digital cable, and a direct cable; and/or a device connected via another data/network; and/or a device connected via a wireless interface, such as a cellular network, a wireless local area network (WLAN), a digital television network such as a digital video broadcasting-handheld (DVB-H) network, a satellite network, an amplitude modulation-frequency modulation (AM-FM) broadcast transmitter; and/or an apparatus of another terminal device configured to receive/transmit communication signals; and/or an Internet of things (IOT) device. A terminal device set to communicate through a wireless interface may be referred to as a "wireless communication terminal", a "wireless terminal" or a "mobile terminal". Examples of mobile terminals include, but are not limited to, a satellite or a cellular phone; a personal communications system (PCS) terminal that may combine cellular radiotelephone with data processing, fax and data communication capability; a PDA that may include a radiotelephone, a pager, an Internet/intranet access, a Web browser, a notebook, a calendar, and/or a global positioning system (GPS) receiver; and a conventional laptop and/or a handheld receiver or other electronic apparatuses including a radiotelephone transceiver.

In an implementation, the network device 110 and the terminal device 120 may be deployed on land, including indoor or outdoor, handheld or in-vehicle; it may also be deployed on water; or may also be deployed on aircrafts, balloons and man-made satellites in the air. The embodiment of the present application does not limit the application scenarios for the network device 110 and the terminal device 120.

In an implementation, communication between the network device 110 and the terminal device 120 and communication between the two terminal devices 120 may be performed through a licensed spectrum, the communication may also be performed through an unlicensed spectrum, or the communication may be performed through a licensed spectrum and an unlicensed spectrum at the same time. The communication between the network device 110 and the terminal device 120 and the communication between the terminal device and the terminal device may be performed through a spectrum below 7 gigahertz (GHz), the communication may also be performed through a spectrum above 7 GHz, and the communication may also be performed by using a spectrum below 7 GHz and a spectrum above 7 GHz at the same time. The embodiment of the present application does not limit spectrum resources used between the network device 110 and the terminal device 120.

An unlicensed spectrum is a spectrum that can be used for radio device communication allocated by countries and regions. This spectrum is usually considered as a shared spectrum, that is, communication devices in different communication systems may use this spectrum as long as they meet regulatory requirements set by countries or regions on this spectrum, there is no need for them to apply to a government for an exclusive spectrum license.

In order to enable various communication systems using the unlicensed spectrum for wireless communication to coexist friendly on the spectrum, some countries or regions have stipulated regulatory requirements that must be met when the unlicensed spectrum is used. For example, an electronic device (or a communication device) follows a principle of listen before talk (LBT), that is, the electronic device needs to perform channel listening before transmitting signals on a channel of the unlicensed spectrum, or perform clear channel assessment (CCA). Only when a result of the channel listening is that the channel is idle, the electronic device can transmit signals; if the result of the channel listening on the channel of the unlicensed spectrum by the electronic device is that the channel is busy, the electronic device cannot transmit signals. In order to ensure fairness, in one transmission, a duration of signal transmission by the electronic device using the channel of the unlicensed spectrum shall not exceed a maximum channel occupancy time (MCOT).

In an implementation, device to device (D2D) communication may be performed between terminal devices 120. In the present application, a signal or a channel transmitted through the device to device communication may be referred to as a sidelink signal or a sidelink, and a transmission opportunity for transmitting the sidelink signal or the sidelink may be referred to as a sidelink transmission opportunity.

In an implementation, the communication system 100 may further include other network entities such as a network controller and a mobile management entity, which is not limited in the embodiment of the present application.

It should be understood that a device with a communication function in a network/system in the embodiment of the present application may be referred to as a communication device. Taking the communication system 100 shown in FIG. 1 as an example, the communication device may include a network device 110 and a terminal device 120 with a communication function. The network device 110 and the terminal device 120 may be specific devices described above, which will not be repeated here; the communication device may further include other devices in the communication system 100, such as other network entities such as a network controller and a mobile management entity, which is not limited in the embodiment of the present application.

System architecture and service scenario described in the embodiment of the present application are to more clearly explain technical solutions of the embodiment of the present application, and do not constitute a limitation on the technical solutions provided in the embodiment of the present application. It is known to those skilled in the art that with evolution of network architecture and emergence of new business scenarios, the technical solutions provided by the embodiment of the present application are also applicable with respect to similar technical problems.

Taking the NR system as an example, uplink transmission in the NR system includes transmission of a PUCCH and transmission of a physical uplink control channel PUSCH). The PUSCH may be used to transmit data and uplink control information (UCI) such as HARQ-ACK information, a precoding matrix indicator (PMI), a channel quality indicator (CQI) and a rank indication (RI). The PUCCH may only be used to transmit UCI, and may not be used to transmit data.

In the prior art, transmission of a PUSCH in the NR system is determined according to a PUSCH preparation time (also referred to as an N2 processing time or N2). The N2 processing time is related to a processing capability of the terminal device, and N2 processing times of terminal devices with different processing capabilities are different.

Exemplarily, the processing capability of the terminal device includes: a processing capability 1 and a processing capability 2. The processing capability 1 and the processing capability 2 correspond to different N2 processing times respectively, or in other words, values of N2 (i.e., PUSCH preparation time) corresponding to the processing capability 1 and the processing capability 2 of the terminal device are different. The value of N2 may be a duration value, the number of symbols, or other quantities used to represent time, which is not limited in the embodiment of the present application.

Table 1 and Table 2 respectively show values of N2 under different processing capabilities of the terminal device, and take the value of N2 being the number of symbols as an example.

TABLE 1

| PUSCH preparation time N2 corresponding to the processing capability 1 of the terminal device | |
|---|---|
| $\mu$ | PUSCH preparation time N2 (the number of symbols) |
| 0 | 10 |
| 1 | 12 |
| 2 | 23 |
| 3 | 36 |

TABLE 2

| PUSCH 2 preparation time N2 corresponding to the processing capability 2 of the terminal device | |
|---|---|
| $\mu$ | PUSCH preparation time N2 (the number of symbols) |
| 0 | 5 |
| 1 | 5.5 |

TABLE 2-continued

| PUSCH 2 preparation time N2 corresponding to the processing capability 2 of the terminal device | |
|---|---|
| $\mu$ | PUSCH preparation time N2 (the number of symbols) |
| 2 | 11 (frequency range 1) |

Table 1 and Table 2, $\mu$ corresponds to a subcarrier spacing configuration with a larger $T_{proc,2}$ in ($\mu_{DL}$, $\mu_{UL}$), is a subcarrier spacing configuration of a PDCCH scheduling the PUSCH, and $\mu_{UL}$ is a subcarrier spacing configuration for uplink data transmission.

If the DCI which is received by the terminal device and transmitted by the network device is uplink grant information, the uplink grant information is used to schedule the terminal device to transmit a target PUSCH carrying a target transmission block and a demodulation reference signal (DMRS), then the terminal device may determine the target PUSCH according to the uplink grant information (for example, according to a start and length indicator value (SLIV) in the uplink grant information). If a starting position of a first uplink symbol of the target PUSCH with consideration of influence of timing advance is not earlier than a symbol L2, the terminal device transmits the target transmission block; if the starting position of the first uplink symbol of the target PUSCH with consideration of the influence of timing advance is earlier than the symbol L2, the terminal device ignores the uplink grant information and does not transmit the target PUSCH.

The symbol L2 is defined as: a next uplink symbol after an end position of a last symbol of the PDCCH carrying the uplink grant information, where a starting position of a cyclic prefix (CP) of the next uplink symbol is later than $T_{proc,2}$, and $T_{proc,2}$ satisfies a formula (1):

$$T_{proc,2}=\max((N_2+d_{2.1})(2048+144)\cdot\kappa 2^{-\mu}\cdot T_C, d_{2.2}) \quad (1)$$

In the formula (1), $\mu$ corresponds to a subcarrier spacing configuration with a larger $T_{proc,2}$ in ($\mu_{DL}$, $\mu_{UL}$) $\mu_{DL}$ is a subcarrier spacing configuration of a PDCCH scheduling the PUSCH, and $\mu_{UL}$ is a subcarrier spacing configuration for uplink data transmission. N2 is a PUSCH preparation time, and a value of N2 is shown in Table 1 or Table 2. If a first symbol in the PUSCH is only used to transmit the DMRS, then $d_{2.1}=0$, otherwise $d_{2.1}=1$. If the DCI scheduled by the PDCCH triggers bandwidth part (bandwidth part, BWP) switching, then $d_{2.2}$ is equal to a switching time of the BWP, otherwise $d_{2.2}=0$, $T_C=1/(\Delta f_{max}\cdot N_f)$, $\Delta f_{max}=480\cdot 10^3$ Hz (hertz), $N_f=4096$, $\kappa=64$.

In the prior art, transmission of a PUCCH in the NR system is determined according to a PDSCH decoding time (also referred to as an N1 processing time or N1). The N1 processing time is related to a processing capability of the terminal device, and N1 processing times of terminal devices with different processing capabilities are different.

Exemplarily, the processing capability of the terminal device includes: a processing capability 1 and a processing capability 2. The processing capability 1 and the processing capability 2 correspond to different N1 processing times respectively, or in other words, values of N1 corresponding to the processing capability 1 and the processing capability 2 of the terminal device are different. Table 3 and Table 4 respectively show the values of N1 under different processing capabilities of the terminal device.

TABLE 3

PDSCH decoding time N1 corresponding to the processing capability 1 of the terminal device PDSCH decoding time N1 (the number of symbols)

| $\mu$ | dmrs-AdditionalPosition=pos0 in DMRS-Downlink Config configuration under DMRS mapping mode A and mapping mode B | dmrs-AdditionalPosition≠pos0 in Downlink Config configuration under DMRS mapping mode A or mapping mode B, or a high-level parameter is not configured |
|---|---|---|
| 0 | 8 | N1,0 |
| 1 | 10 | 13 |
| 2 | 17 | 20 |
| 3 | 20 | 24 |

TABLE 4

PDSCH decoding time N1 corresponding to the processing capability 2 of the terminal device

| $\mu$ | PDSCH decoding time N1 (the number of symbols) dmrs-AdditionalPosition=pos0 in DMRS-Downlink Config configuration under DMRS mapping mode A and mapping mode B |
|---|---|
| 0 | 3 |
| 1 | 4 |
| 2 | 9 |
| | (frequency range 1) |

In Table 3 and Table 4, $\mu$ corresponds to a subcarrier spacing configuration with a larger $T_{proc,1}$ in ($\mu_{PDCCH}$, $\mu_{PDSCH}$, $\mu_{UL}$), $\mu_{PDCCH}$ corresponds to a subcarrier spacing configuration of a PDCCH scheduling the PDSCH, $\mu_{PDSCH}$ corresponds to a subcarrier spacing configuration of the PDSCH to be scheduled, and $\mu_{UL}$ corresponds to a subcarrier spacing configuration of an uplink channel for transmitting the HARQ-ACK.

If the DCI which is received by the terminal device and transmitted by the network device is downlink grant information, the downlink grant information is used to schedule the terminal device to receive a PDSCH carrying a target transmission block, the terminal device can determine that HARQ-ACK information corresponding to the scheduled PDSCH is transmitted through a target PUCCH according to HARQ-ACK timing information K1 and PUCCH resource indication information included in the DCI. If a starting position of a first uplink symbol of the target PUCCH with consideration of influence of timing advance is not earlier than a symbol L1, the terminal device transmits valid HARQ-ACK information of the scheduled PDSCH to the network device through the target PUCCH; if the starting position of the first uplink symbol of the target PUCCH with consideration of the influence of timing advance is earlier than the symbol L1, the terminal device may not transmit the valid HARQ-ACK information of the scheduled PDSCH to the network device.

The symbol L1 is defined as: a next uplink symbol after an end position of a last symbol of the PDSCH carrying the target transmission block, where a starting position of a CP of the next uplink symbol is later than $T_{proc,1}$, and $T_{proc,1}$ satisfies a formula (2):

$$T_{proc,1}=(N_1+d_{1,1})(2048+144)\cdot\kappa 2^{-\mu}\cdot T_C \quad (2)$$

In the formula (2), $\mu$ corresponds to a subcarrier spacing configuration with a larger $T_{proc,1}$ in ($\mu_{PDCCH}$, $\mu_{PDSCH}$, $\mu_{UL}$), $\mu_{PDCCH}$ corresponds to a subcarrier spacing configuration of a PDCCH scheduling the PDSCH, $\mu_{PDSCH}$ corresponds to a subcarrier spacing configuration of the PDSCH to be scheduled, and $\mu_{UL}$ corresponds to a subcarrier spacing configuration of an uplink channel for transmitting the HARQ-ACK. N1 is a PDSCH decoding time, and a value of N1 refers to Table 3 or Table 4. A value of $d_{1,1}$ is related to a mapping type of the PDSCH and a symbol length of the PDSCH, $T_C=1/(\Delta f_{max}\cdot N_f)$, $\Delta f_{max}=480\cdot 10^3$ Hz, $N_f=4096$, $\kappa=64$.

In the NR system, the transmission of the PUCCH carrying the HARQ-ACK information is determined according to the PDSCH decoding time.

In the NR-U system, a one-shot HARQ-ACK feedback is introduced, and the one-shot HARQ-ACK feedback is used to trigger feedback of a Type-3 HARQ-ACK codebook. The DCI carrying the one-shot HARQ-ACK feedback request information may schedule transmission of a PDSCH or may not schedule transmission of the PDSCH. When the DCI schedules the PDSCH, the terminal device may perform transmission of an uplink channel for the one-shot HARQ-ACK feedback, such as transmission of the PUCCH, according to a processing time for a scheduled PDSCH (or the PDSCH decoding time). However, when the DCI does not schedule the PDSCH, the terminal device cannot perform transmission of the uplink channel for the one-shot HARQ-ACK feedback according to the processing time for the PDSCH, thus leading to a failure of the one-shot HARQ-ACK feedback. How to determine whether the uplink channel for the one-shot HARQ-ACK feedback meets the processing time is a problem to be solved.

Figure 2:
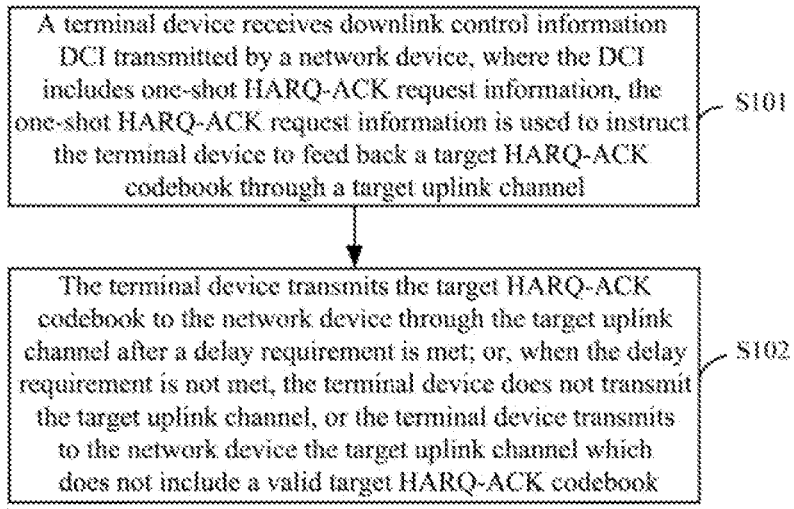
FIG. 2 is a flowchart of a communication method provided in Embodiment 1 of the present application.

FIG. 2 is a flowchart of a communication method provided in Embodiment 1 of the present application. As shown in FIG. 2, the method provided in this embodiment includes at least part of the following contents.

The embodiment of the present application provides an information transmission method, which is suitable to a case where DCI schedules a PDSCH or DCI does not schedule the PDSCH, through carrying of request information in the DCI that instructs a terminal device to perform transmission of a target uplink channel or signal, the terminal device is instructed to perform uplink transmission on a target uplink resource. The terminal device transmits the target uplink channel or signal to the network device through the target uplink resource after a delay requirement is met; or, when the delay requirement is not met, the terminal device does not transmit the target uplink channel or signal or the terminal device transmits the target uplink channel or signal to the network device, the target uplink channel including at least part of invalid information. The DCI may schedule the PDSCH or may not schedule the PDSCH, so as to ensure that the terminal device can determine a processing delay of the target uplink channel or signal when the DCI schedules the PDSCH or does not schedule the PDSCH and ensure accurate transmission of information of the target uplink channel or signal.

In an implementation, the target uplink channel or signal includes at least one of the following: a PUSCH, a PUCCH, a physical random access channel (PRACH), a sounding reference signal (SRS), and a phase-tracking reference signal (PT-RS).

In an implementation, the DCI includes the downlink grant information or the uplink grant information.

In an implementation, the method in the embodiment of the present application may also be applied to communication between terminal devices, for example, to determine whether a target sidelink or signal meets a processing time field, which will not be repeated in the present application.

Hereinafter, the method of the embodiment of the present application is described by taking a one-shot HARQ-ACK feedback process, transmission of a scheduled PUSCH and a scheduled PUCCH as an example. DCI carrying one-shot HARQ-ACK feedback request information may schedule transmission of a PDSCH or may not schedule the transmission of the PDSCH.

Step S101: a terminal device receives DCI transmitted by a network device, where the DCI includes one-shot HARQ-ACK request information.

The one-shot HARQ-ACK request information is used to instruct the terminal device to feed back a target HARQ-ACK codebook through a target uplink channel, and the target uplink channel includes a PUCCH or a PUSCH. In an implementation, the target HARQ-ACK codebook may be a Type-3 HARQ-ACK codebook.

In an implementation, the one-shot HARQ-ACK request information may refer to that a one-shot HARQ-ACK information request field in the DCI is a preset value. For example, a value of the one-shot HARQ-ACK information request field may be 1 or 0. When the value of the HARQ-ACK information request field is 1, it means that the terminal device needs to perform a one-shot HARQ-ACK feedback. When the value of the HARQ-ACK information request field is 0, it means that the terminal device does not need to perform the one-shot HARQ-ACK feedback.

In an implementation, the DCI includes scheduling information of the terminal device, and the scheduling information is used to schedule the terminal device for downlink reception or uplink transmission. The scheduling information scheduling the terminal device to receive data is also called downlink scheduling information or downlink grant information, and the scheduling information scheduling the terminal device to transmit data is also called uplink scheduling information or uplink grant information. Therefore, it can also be said that the DCI includes the downlink grant information or the uplink grant information.

In an implementation, when the DCI includes the uplink grant information, the uplink grant information is grant information or scheduling information of the PUSCH, that is, the DCI is used to schedule the PUSCH, and scheduling the PUSCH refers to schedule the terminal device to transmit the PUSCH. Where the uplink grant information includes the one-shot HARQ-ACK information request field. When the one-shot HARQ-ACK information request field is a preset value, for example, when the one-shot HARQ-ACK request information field is "1", the DCI is used to indicate that the terminal device needs to perform the one-shot HARQ-ACK feedback through the PUSCH.

In an implementation, when the DCI includes the downlink grant information, the downlink grant information refers to the grant information or the scheduling information of the PDSCH. The DCI may schedule the PDSCH or may not schedule the PDSCH, scheduling the PDSCH refers to schedule the terminal device to receive the PDSCH, and not scheduling the PDSCH refers to not schedule the terminal device to receive the PDSCH. It should be understood that when the DCI does not schedule the PDSCH, the DCI may schedule a PUSCH or may not schedule the PUSCH, which is not limited in the embodiment of the present application.

The terminal device may feed back the target HARQ-ACK codebook on a target PUCCH or a target PUSCH, and the terminal device may determine the target PUCCH or the target PUSCH according to information included in the DCI.

In an optional embodiment, the DCI also includes: feedback time indication information of the PUCCH and/or feedback resource indication information of the PUCCH, and the terminal device determines the target PUCCH for feeding back the one-shot HARQ-ACK according to the feedback time indication information of the PUCCH and/or the feedback resource indication information of the PUCCH. For example, the feedback time indication information of the PUCCH includes the number of time slots K1 indicated by a feedback time indication field from a PDSCH to HARQ in the DCI. K1 is used to indicate that the terminal device transmits the target PUCCH in a K1th time slot after receiving a time slot of a PDCCH carrying the DCI. The feedback resource indication information of the PUCCH includes a PUCCH resource index indicated by a PUCCH resource indication field in the DCI, the PUCCH resource index is used to determine the target PUCCH resource from a preset PUCCH resource set.

In an optional embodiment, if a PUCCH for feeding back one-shot HARQ-ACK determined by the terminal device according to DCI overlaps with a PUSCH of the terminal device in a time domain, the terminal device may determine that the target uplink channel is the PUSCH, or the terminal device may feed back the one-shot HARQ-ACK information through the PUSCH.

In an optional embodiment, the DCI also includes uplink grant information, the uplink grant information includes an SLIV indicator, and the terminal device determines the target PUSCH for feeding back one-shot HARQ-ACK according to the SLIV indicator.

S102: the terminal device transmits the target HARQ-ACK codebook to the network device through the target uplink channel after a delay requirement is met; or, when the delay requirement is not met, the terminal device does not transmit the target uplink channel or the terminal device transmits to the network device the target uplink channel which does not include a valid target HARQ-ACK codebook.

In an implementation, the terminal device determines whether the target uplink channel meets a processing delay according to the DCI, and the processing delay may be determined according to a starting position for transmitting the target uplink channel by the terminal device and/or a processing capability of the terminal device. When the DCI is the downlink grant information, if the DCI does not schedule the PDSCH, the processing delay is a first processing delay. If the DCI schedules the PDSCH, the processing delay is a second processing delay. The first processing delay and the second processing delay may be different or the same.

In an implementation, the terminal device may judge whether the target uplink channel meets the delay requirement. If the target uplink channel meets the delay requirement, the terminal device may transmit the target HARQ-ACK codebook to the network device through the target uplink channel. Or, if the target uplink channel does not meet the delay requirement, the terminal device does not transmit the target uplink channel, or the terminal device transmits the target uplink channel to the network device, but the target uplink channel does not include the valid target HARQ-ACK codebook.

In an implementation, the target HARQ-ACK codebook includes HARQ-ACK information; or, the target HARQ-ACK codebook includes HARQ-ACK information and new data indicator (NDI) information; or, the target HARQ-ACK codebook includes HARQ-ACK information and new feedback indicator (NFI) information. The network device may configure whether the terminal device needs to carry the NDI information when feeding back HARQ-ACK information through radio resource control (RRC) signaling.

In an implementation, where the target uplink channel does not include the valid target HARQ-ACK codebook may be understood as: the target HARQ-ACK codebook is all invalid information, such as all invalid HARQ-ACK information, or information in the target HARQ-ACK codebook that does not meet the processing timing, such as the HARQ-ACK information is invalid HARQ-ACK information. The invalid HARQ-ACK information may be a preset value, for example, it may be a negative acknowledgment (NACK). When the terminal device does not meet the delay requirement, it will transmit the target HARQ-ACK codebook carrying the NACK to the network device. After receiving the target HARQ-ACK codebook, the network device will determine whether information included in the target HARQ-ACK codebook is valid information or invalid information according to whether the processing timing is met.

In an implementation, when the target uplink channel meets the delay requirement, the network device receives the target HARQ-ACK codebook transmitted by the terminal device through the target uplink channel, and the target HARQ-ACK codebook may be considered as a valid target HARQ-ACK codebook, or the target HARQ-ACK codebook includes at least part of valid information.

In an implementation, when the target uplink channel does not meet the delay requirement, the terminal device may not transmit the target uplink channel, or the terminal device may not transmit the target HARQ-ACK codebook, or the terminal device transmits the target uplink channel, but the target uplink channel does not include the valid target HARQ-ACK codebook, or, the terminal device transmits the target HARQ-ACK codebook through the target uplink channel, and the target HARQ-ACK codebook includes at least part of invalid information.

In an implementation, when the target uplink channel does not meet the delay requirement, if the terminal device does not transmit the target uplink channel, then the network device does not need to receive the target uplink channel, or if the terminal device does not transmit the target HARQ-ACK codebook, then the network device does not need to receive the target HARQ-ACK codebook.

In an implementation, when the target uplink channel does not meet the delay requirement, if the terminal device transmits the target uplink channel or the target HARQ-ACK codebook, then the network device receives the target uplink channel or the target HARQ-ACK codebook and discards the invalid information in the target HARQ-ACK codebook.

In an implementation, in the embodiment of the present application, the network device may determine the valid information and/or the invalid information in the target HARQ-ACK codebook according to the delay requirement.

It should be understood that in some cases, for example, in an NR-U system, when the terminal device is scheduled for transmission of uplink channel (such as PUSCH or PUCCH), a starting position of the uplink channel may be located before a valid uplink channel transmission resource (such as a uplink symbol for transmitting valid information); in other words, a first uplink symbol of the uplink channel includes a cyclic prefix extension CPE; in other words, the starting position of the uplink channel is located at a starting position of the cyclic prefix extension (CPE); in other words, the starting position of the uplink channel is located at a middle position of uplink symbols before the first uplink symbol of the uplink channel, where a length between the middle position and the starting position of the first uplink symbol is a length of the CPE.

In an implementation, the length of the CPE that can be instructed to the terminal device includes one of the following cases:
1) 0 (in other words, no CPE)
2) C1* symbol length—25 us
3) C2* symbol length—16 us—timing advance (TA)
4) C3* symbol length—25 us—TA In an implementation, values of C1, C2 and C3 may be different under different subcarrier spacings.

In an implementation, a value of C1 is preset, such as agreed in a protocol. For example, C1=1 at 15 and 30 kHz subcarrier spacing (SCS) and C1=2 at 60 kHz SCS.

In an implementation, values of C2 and/or C3 may be preset or configured by the network device.

In the following, how to determine whether the target uplink channel meets the delay requirement when DCI is uplink grant information and when DCI is downlink grant information will be described. When DCI is downlink grant information, the DCI is divided into DCI scheduling a PDSCH and DCI not scheduling a PDSCH. In an implementation, in cases where the DCI scheduling the PDSCH and the DCI not scheduling the PDSCH trigger uplink feedback, the delay requirements of the target uplink channel may be different.

In an optional embodiment, the DCI includes downlink grant information, but the DCI does not schedule a PDSCH, and the terminal device determines whether the target uplink channel meets the processing delay according to a first duration preset or configured by the network device.

In an implementation, the first symbol in the target uplink channel may include the cyclic prefix extension (CPE) or not include the CPE.

In an implementation, the terminal device receives downlink grant DCI, and the DCI does not schedule transmission of a PDSCH, where the one-shot HARQ-ACK information request field in the DCI is a preset value, which is used to schedule the terminal device to transmit a target HARQ-ACK codebook through the target uplink channel, and the target codebook includes a Type-3 HARQ-ACK codebook. The terminal device determines whether the target uplink channel meets the processing delay according to a first duration preset or configured by the network device.

In an implementation, where the terminal device transmits the target HARQ-ACK codebook to the network device through the target uplink channel after the delay requirement is met includes: the terminal device transmitting the target HARQ-ACK codebook to the network device through the target uplink channel after the first duration starting from a last symbol of the target PDCCH carrying the DCI.

In an implementation, starting from the last symbol includes starting from an end position of the last symbol. For example, where the terminal device transmits the target HARQ-ACK codebook to the network device through the target uplink channel after the delay requirement is met includes: the terminal device transmitting the target HARQ-ACK codebook to the network device through the target uplink channel after the first duration starting from the end position of the last symbol of the target PDCCH carrying the DCI.

In an implementation, the first duration is preset or configured by the network device.

In an implementation, a unit of the first duration may include at least one of the following: sampling point, symbol, time slot, subframe, millisecond, and microsecond.

In an implementation, the first duration may include N symbols, and N is an integer greater than 0.

In an implementation, the first duration may be associated with the processing capability of the terminal device, and different processing capabilities of the terminal device correspond to different values of N, for example, a processing capability 1 and a processing capability 2 of the terminal device correspond to different values of N respectively.

As an example, Table 5 shows values of the first duration of the terminal device under a processing capability, in which an example is taken where the first duration is the number of symbols N.

As an example, Table 6 shows values of the first duration of the terminal device under another processing capability, in which an example is taken where the first duration is the number of symbols N.

TABLE 5

| values of N corresponding to a processing capability of the terminal device | |
|---|---|
| μ (target subcarrier spacing) | N (the number of symbols) |
| 0 (15 kHz) | 10 |
| 1 (30 kHz) | 12 |
| 2 (60 kHz) | 22 |
| 3 (120 kHz) | 25 |

TABLE 6

| values of N corresponding to another processing capability of the terminal device | |
|---|---|
| μ (target subcarrier spacing) | N (number of symbols) |
| 0 (15 kHz) | 5 |
| 1 (30 kHz) | 5.5 |
| 2 (60 kHz) | 11 |

Where the target subcarrier spacing μ in Table 5 and Table 6 is a smaller subcarrier spacing configuration between the subcarrier spacing of the target PDCCH carrying the DCI and the subcarrier spacing of the target uplink channel; or, the target subcarrier spacing μ is the subcarrier spacing configuration of the target PDCCH. 0, 1, 2 and 3 represent subcarrier spacing configurations respectively. 0 indicates that the subcarrier spacing is 15 kHz, 1 indicates that the subcarrier spacing is 30 kHz, 2 indicates that the subcarrier spacing is 60 kHz, and 3 indicates that the subcarrier spacing is 120 kHz.

Taking the target uplink channel being a PUCCH as an example, the terminal device determines the smaller subcarrier spacing between the subcarrier spacing of the target PDCCH carrying the DCI and the subcarrier spacing of the PUCCH as the target subcarrier spacing, or determines the subcarrier spacing of the target PDCCH as the target subcarrier spacing, and then determines N corresponding to the target subcarrier spacing according to the target subcarrier spacing and a corresponding relationship between target subcarrier spacings and N shown in Table 5 or Table 6.

The N corresponding to the target subcarrier spacing is the number of symbols expected to be delayed when the terminal device transmits the target uplink channel, such as the target PUCCH.

For example, the terminal device transmits the target HARQ-ACK codebook to the network device through the target uplink channel after N symbols starting from the last symbol of the target PDCCH carrying the DCI.

For another example, a time length between the starting position of the target uplink channel and the end position of the last symbol of the target PDCCH carrying the DCI is greater than or equal to N symbols.

For another example, the terminal device judges whether the starting position of the first uplink symbol of the target uplink channel (such as the target PUCCH) with consideration of the influence of timing advance is earlier than an expected symbol, and the expected symbol is a symbol delayed by N symbols from the last symbol of the target PDCCH carrying the DCI. When the starting position of the first uplink symbol of the target PUCCH with consideration of the influence of timing advance is not earlier than the expected symbol, it is determined that the target PUCCH meets the delay requirement. The terminal device transmits the target HARQ-ACK codebook to the network device through the target PUCCH after N symbols starting from the last symbol of the target PDCCH carrying the DCI. Alternatively, when the starting position of the first uplink symbol of the target PUCCH with consideration of the influence of timing advance is earlier than the expected symbol, it is determined that the target PUCCH does not meet the delay requirement.

In an implementation, the starting position of the first uplink symbol of the target PUCCH with consideration of the influence of timing advance includes: a starting position of the target PUCCH.

In an implementation, the starting position of the target uplink channel includes one of the following situations:
  a starting position of a CP of the first uplink symbol in the target uplink channel with consideration of the influence of timing advance;
  a starting position of a CPE of the first uplink symbol in the target uplink channel with consideration of the influence of timing advance.

In an optional embodiment, the DCI is downlink grant information, but the DCI does not schedule a PDSCH. The terminal device determines whether the target uplink channel meets the processing delay according to an N1 processing time, and the N1 processing time is a PDSCH decoding time.

In an implementation, the first symbol in the target uplink channel may include a CPE or may not include a CPE.

In an implementation, the terminal device receives the downlink grant DCI, and the DCI does not schedule transmission of the PDSCH. Where the one-shot HARQ-ACK information request field in the DCI is a preset value, which is used to schedule the terminal device to transmit the target HARQ-ACK codebook through the target uplink channel. The target codebook includes a Type-3 HARQ-ACK codebook. The terminal device determines whether the target uplink channel meets the processing delay according to the N1 processing time.

In an implementation, where the terminal device transmits the target HARQ-ACK codebook to the network device through the target uplink channel after the delay requirement is met includes: after determining that the starting position of the first uplink symbol of the target uplink channel with consideration of the influence of timing advance is not earlier than a first symbol, the terminal device transmitting the target HARQ-ACK codebook to the network device through the target uplink channel, where the first symbol is a next uplink symbol after an end position of a last symbol of a target PDCCH carrying the DCI and a starting position of a CP of the next uplink symbol is later than a second duration.

In an implementation, a unit of the second duration may include at least one of the following: sampling point, symbol, time slot, subframe, millisecond, and microsecond.

In an implementation, the first symbol corresponds to a symbol L1.

In an implementation, the second duration is determined according to the N1 processing time. Exemplarily, the second duration is T1, and T1 satisfies the following formula (3):

$$T_1 = (N_1 + d_{1,1})(2048 + 144) \cdot \kappa 2^{-\mu} \cdot T_C \qquad (3);$$

where $\mu$ corresponds to a subcarrier spacing configuration in $\mu_{PDCCH}$, $\mu_{UL}$) that can determine a larger T1 value, $\mu_{PDCCH}$ corresponds to a subcarrier spacing of the target PDCCH, or, $\mu_{PDCCH}$ is a subcarrier spacing configuration of the target PDCCH, $\mu_{UL}$ corresponds to the subcarrier spacing of the target uplink channel, or, $\mu_{UL}$ is the subcarrier spacing configuration of the target uplink channel. N1 is the PDSCH decoding time, and the value of N1 is shown in Table 3 or Table 4 above, $T_C = 1/(\Delta f_{max} \cdot N_f)$, $\Delta f_{max} = 480 \cdot 10^3$ Hz, $N_f = 4096$, $\kappa = 64$.

In an implementation, since DCI does not schedule the PDSCH, the value of $d_{1,1}$ is 0.

Taking the target uplink channel being the target PUCCH as an example, the terminal device determines a target subcarrier spacing configuration $\mu$ according to a subcarrier spacing of the target PDCCH and a subcarrier spacing of the target PUCCH, and determines N1 corresponding to the target subcarrier spacing configuration $\mu$ according to the target subcarrier spacing configuration $\mu$, and the corresponding relationship between subcarrier spacings and N1 shown in Table 3 or Table 4. Then, T1 is obtained according to N1 and the above formula (3), the first symbol is determined according to T1, and whether the target PUCCH meets the delay requirement is determined according to the first symbol.

In an implementation, the first symbol is the next uplink symbol after the end position of the last symbol of the target PDCCH carrying the DCI and the starting position of the CP of the first symbol is later than T1. Here, the next uplink symbol refers to a first uplink symbol in uplink symbols whose starting position of the CP is later than T1. For example, if the last symbol of the target PDCCH is symbol 3 and a length of T1 is 4.5 symbols, the next uplink symbol whose starting position of the CP is later than T1 refers to symbol 8, or the first symbol is symbol 8.

After determining the first symbol, the terminal device judges whether the starting position of the target uplink channel, for example, the starting position of the first uplink symbol of the target PUCCH with consideration of the timing advance (or with consideration of the influence of timing advance) is earlier than the first symbol, when the starting position of the first uplink symbol of the target PUCCH with consideration of the timing advance is not earlier than the first symbol, the terminal device determines that the target PUCCH meets the delay requirement, or when the starting position of the first uplink symbol of the target PUCCH with consideration of the timing advance is earlier than the first symbol, the terminal device determines that the target PUCCH does not meet the delay requirement. After determining that the target PUCCH meets the delay requirement, the terminal device transmits the target HARQ-ACK codebook to the network device through the target PUCCH.

In an implementation, the starting position of the first uplink symbol of the target PUCCH with consideration of the timing advance includes: a starting position of the target PUCCH.

In an implementation, the starting position of the target uplink channel includes one of the following situation: a starting position of a CP of the first uplink symbol in the target uplink channel with consideration of the influence of timing advance; a starting position of a CPE of the first uplink symbol in the target uplink channel with consideration of the influence of timing advance.

In an optional embodiment, when DCI includes downlink grant information, but the DCI does not schedule a PDSCH, the terminal device determines whether the target uplink channel meets the processing delay according to an N2 processing time, and N2 is a PUSCH preparation time.

In an implementation, a first symbol in the target uplink channel may include a CPE or may not include a CPE.

In an implementation, the terminal device receives the downlink grant DCI, and the DCI does not schedule transmission of the PDSCH, where the one-shot HARQ-ACK information request field in the DCI is a preset value, which is used to schedule the terminal device to transmit the target HARQ-ACK codebook through the target uplink channel, and the target codebook includes a Type-3 HARQ-ACK codebook. The terminal device determines whether the target uplink channel meets the processing delay according to the N2 processing time.

In an implementation, where the terminal device transmits the target HARQ-ACK codebook to the network device through the target uplink channel after the delay requirement is met includes: after determining that a starting position of a first uplink symbol of the target uplink channel with consideration of the influence of timing advance is not earlier than a first symbol, the terminal device transmits the target HARQ-ACK codebook to the network device through the target uplink channel, where the first symbol is a next uplink symbol after an end position of a last symbol of a target PDCCH carrying the DCI and a starting position of a CP of the next uplink symbol is later than the second duration.

In an implementation, a unit of the second duration may include at least one of the following: sampling point, symbol, time slot, subframe, millisecond, and microsecond.

In an implementation, the first symbol corresponds to a symbol L2.

In an implementation, the second duration is determined according to the N2 processing time. Exemplarily, the second duration is T2, and T2 satisfies the following formula (4):

$$T_2 = \max((N_2 + d_{2,1})(2048 + 144) \cdot \kappa 2^{-\mu} \cdot T_C, d_{2,2}) \qquad (4)$$

where $\mu$ corresponds to a subcarrier spacing configuration in ($\mu_{DL}$, $\mu_{UL}$) that can determine a larger T2 value, $\mu_{DL}$ corresponds to a subcarrier spacing of the target PDCCH, or, $\mu_{DL}$ is the subcarrier spacing configuration of the target PDCCH, $\mu_{UL}$ corresponds to a subcarrier spacing of the target uplink channel, or, $\mu_{UL}$ is the subcarrier spacing configuration of the target uplink channel. N2 is the PUSCH preparation time, and the value of N2 is shown in Table 1 or Table 2 above, the value of $d_{2,1}$ is 0. If BWP switching occurs in the target uplink channel, then $d_{2,2}$ is equal to a switching time of the BWP, otherwise $d_{2,2}=0$, $T_c=1/(\Delta f_{max} \cdot N_f)$, $\Delta f_{max}=480 \cdot 10^3$ Hz, $N_f=4096$, $\kappa=64$.

Taking the target uplink channel being a target PUCCH as an example, the terminal device determines a target subcarrier spacing configuration $\mu$ according to a subcarrier spacing of the target PDCCH and a subcarrier spacing of the target PUCCH, and determines N2 corresponding to the target subcarrier spacing configuration $\mu$ according to the target subcarrier spacing configuration $\mu$, and the corresponding relationship between subcarrier spacings and N1 shown in Table 1 or Table 2. Then, T2 is obtained according to N2 and the above formula (4), the first symbol is determined according to T2, and whether the target PUCCH meets the delay requirement is determined according to the first symbol.

In an implementation, the first symbol is the next uplink symbol after the end position of the last symbol of the target PDCCH carrying the DCI and the starting position of the CP of the first symbol is later than T2. Here, the next uplink symbol refers to a first uplink symbol in uplink symbols whose starting position of the CP is later than T2. For example, if the last symbol of the target PDCCH is symbol 3 and a length of T2 is 4.5 symbols, the next uplink symbol whose starting position of the CP is later than T2 refers to symbol 8, or the first symbol is symbol 8.

After determining the first symbol, the terminal device judges whether the starting position of the target uplink channel, for example, the starting position of the first uplink symbol of the target PUCCH with consideration of the timing advance is earlier than the first symbol, when the starting position of the first uplink symbol of the target PUCCH with consideration of the timing advance is not earlier than the first symbol, the terminal device determines that the target PUCCH meets the delay requirement, or when the starting position of the first uplink symbol of the target PUCCH with consideration of the timing advance is earlier than the first symbol, the terminal device determines that the target PUCCH does not meet the delay requirement. After determining that the target PUCCH meets the delay requirement, the terminal device transmits the target HARQ-ACK codebook to the network device through the target PUCCH.

In an implementation, the starting position of the first uplink symbol of the target PUCCH with consideration of the timing advance includes: a starting position of the target PUCCH.

In an implementation, the starting position of the target uplink channel includes one of the following situation: a starting position of a CP of the first uplink symbol in the target uplink channel with consideration of the influence of timing advance; a starting position of a CPE of the first uplink symbol in the target uplink channel with consideration of the influence of timing advance.

In an optional embodiment, the DCI is uplink grant information, the DCI schedules the terminal device to transmit the target uplink channel, such as a target PUSCH. The terminal device determines whether the target uplink channel, such as the target PUSCH, meets the processing delay according to an N2 processing time, and the N2 processing time is a PUSCH preparation time.

In an implementation, a first symbol in the target uplink channel may include a CPE or may not include a CPE.

In an implementation, the terminal device receives the uplink grant DCI, and the DCI schedules transmission of the target PUSCH, where the DCI includes the one-shot HARQ-ACK information request field, and the one-shot HARQ-ACK information request field is a preset value, which is used to schedule the terminal device to transmit the target HARQ-ACK codebook through the target PUSCH, and the target codebook includes a Type-3 HARQ-ACK codebook. The terminal device determines whether the target uplink channel, for example, the target PUSCH meets the processing delay according to the N2 processing time.

In an implementation, the terminal device receives the uplink grant DCI, and the DCI is used to schedule the terminal device to transmit a transmission block (or data packet) through the target PUSCH. The terminal device determines whether the target uplink channel, for example, the target PUSCH meets the processing delay according to the N2 processing time.

In an implementation, where the terminal device transmits the target HARQ-ACK codebook and/or the transmission block to the network device through the target uplink channel after the delay requirement is met includes: after determining that a starting position of a first uplink symbol of the target PUSCH with consideration of influence of timing advance is not earlier than a first symbol, the terminal device transmits the target HARQ-ACK codebook and/or the transmission block to the network device through the target PUSCH, where the first symbol is a next uplink symbol after an end position of a last symbol of the target PDCCH carrying the DCI and a starting position of a CP of the next uplink symbol is later than a second duration.

In an implementation, a unit of the second duration may include at least one of the following: sampling point, symbol, time slot, subframe, millisecond, and microsecond.

In an implementation, the first symbol corresponds to a symbol L2.

In an implementation, the second duration is determined according to the N2 processing time. Exemplarily, the second duration is T2, and T2 satisfies the above formula (4).

The terminal device determines a target subcarrier spacing configuration µ according to a subcarrier spacing of the target PDCCH and a subcarrier spacing of the target PUCCH, and determines N2 corresponding to the target subcarrier spacing configuration according to the target subcarrier spacing configuration and the corresponding relationship between subcarrier spacings and N2 shown in Table 1 or Table 2. Then, T2 is obtained according to N2 and the above formula (4), the first symbol is determined according to T2, and whether the target PUSCH meets the delay requirement is determined according to the first symbol.

In an implementation, the first symbol is the next uplink symbol after the end position of the last symbol of the target PDCCH carrying the DCI and the starting position of the CP of the first symbol is later than T2. Here, the next uplink symbol refers to a first uplink symbol in uplink symbols whose starting position of the CP is later than T2.

After determining the first symbol, the terminal device judges whether the starting position of the target uplink channel, for example, the starting position of the first uplink symbol of the target PUSCH with consideration of the timing advance is earlier than the first symbol, when the starting position of the first uplink symbol of the target PUSCH with consideration of the timing advance is not earlier than the first symbol, the terminal device determines that the target PUSCH meets the delay requirement, or when the starting position of the first uplink symbol of the target PUSCH with consideration of the timing advance is earlier than the first symbol, the terminal device determines that the target PUSCH does not meet the delay requirement.

In an implementation, the starting position of the first uplink symbol of the target PUSCH with consideration of the timing advance includes: a starting position of the target PUSCH.

In an implementation, the starting position of the target uplink channel includes one of the following situation: a starting position of a CP of the first uplink symbol in the target uplink channel with consideration of the influence of timing advance; a starting position of a CPE of the first uplink symbol in the target uplink channel with consideration of the influence of timing advance.

Figure 3:
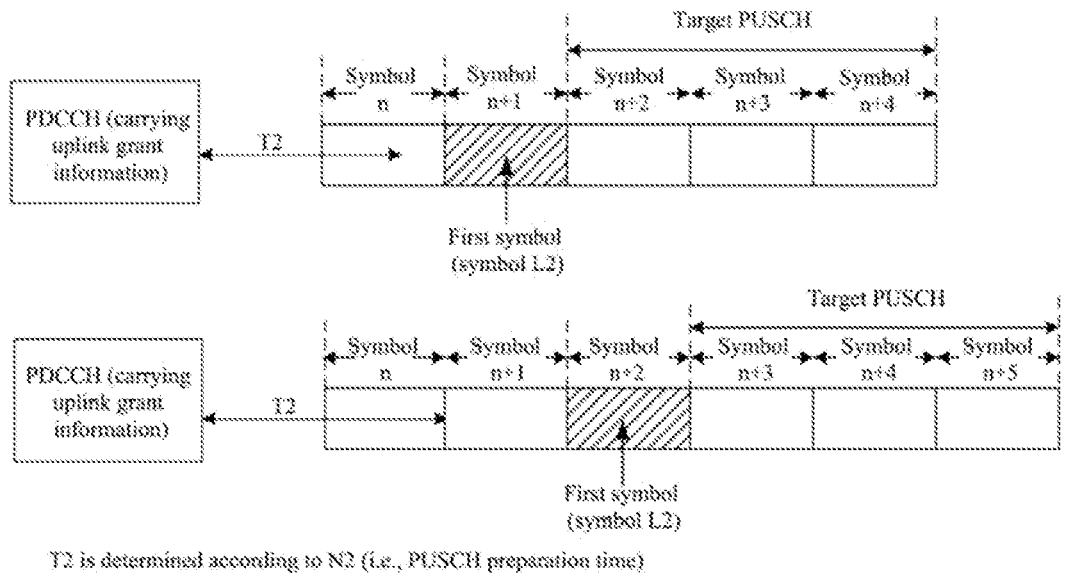
FIG. 3 is a schematic timing diagram of uplink scheduling when a processing delay of a PUSCH is determined according to N2.

FIG. 3 is a schematic timing diagram of uplink scheduling when a processing delay of a PUSCH is determined according to N2. As shown in FIG. 3, when a PDCCH carries uplink grant information, after receiving the PDCCH, the terminal device determines the first symbol (or a symbol L2) according to a last symbol for transmitting the PDCCH and a T2 duration, where the first symbol is a next uplink symbol after the T2 duration starting from an end position of the last symbol of the PDCCH. T2 is determined according to N2.

In one example, an end position of T2 is located at a middle position of an uplink symbol n, therefore, the next uplink symbol after the T2 duration starting from the end position of the last symbol of the PDCCH is a symbol n+1, or in other words, the first symbol is the uplink symbol n+1. When a starting position of a first uplink symbol of the target PUSCH with consideration of the timing advance is not earlier than the first symbol, it is determined that the target PUSCH meets the delay requirement, or when the starting position of the first uplink symbol of the target PUSCH with consideration of the timing advance is earlier than the first symbol, it is determined that the target PUSCH does not meet the delay requirement. As shown in the figure, when the target PUSCH is scheduled to transmit on symbols n+2, n+3 and n+4, it may be considered that the target PUSCH meets the delay requirement.

In another example, the end position of T2 is located at an ending position of the uplink symbol n, therefore, the next uplink symbol after the T2 duration starting from the end position of the last symbol of the PDCCH is the symbol n+2, or in other words, the first symbol is the uplink symbol n+2. When the starting position of the first uplink symbol of the target PUSCH with consideration of the timing advance is not earlier than the first symbol, it is determined that the target PUSCH meets the delay requirement, or when the starting position of the first uplink symbol of the target PUSCH with consideration of the timing advance is earlier than the first symbol, it is determined that the target PUSCH does not meet the delay requirement. As shown in the figure, when the target PUSCH is scheduled to transmit on symbols n+3, n+4 and n+5, it may be considered that the target PUSCH meets the delay requirement.

In some examples, when the end position of T2 is located at the end position of the uplink symbol n, the terminal device may determine the uplink symbol n+1 as the first symbol, and the present application does not exclude such a situation.

Figure 4:
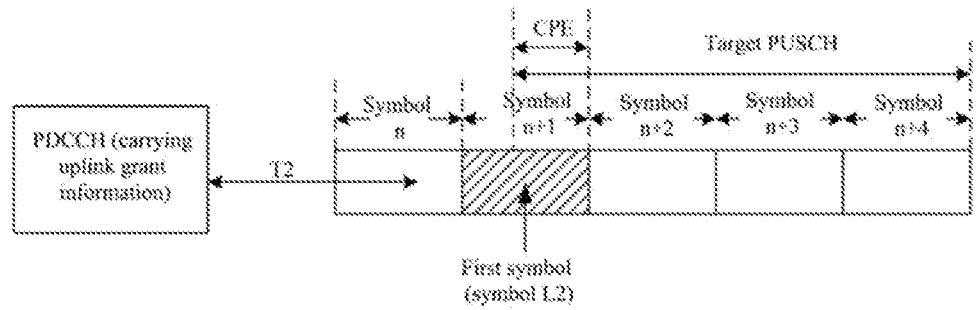
FIG. 4 is a schematic timing diagram of uplink scheduling when a processing delay of a PUSCH is determined according to N2.

FIG. 4 is a schematic timing diagram of uplink scheduling when a processing delay of a PUSCH is determined according to N2. As shown in FIG. 4, when a PDCCH carries uplink grant information, after receiving the PDCCH, the terminal device determines the first symbol (or a symbol L2) according to a last symbol for transmitting the PDCCH and a T2 duration, where the first symbol is a next uplink symbol after the T2 duration starting from an end position of the last symbol of the PDCCH. T2 is determined according to N2.

As shown in FIG. 4, the terminal device determines that the first symbol is an uplink symbol n+1. The first symbol in the target PUSCH scheduled by the uplink grant information includes a CPE. When a starting position of a CPE of the first uplink symbol of the target PUSCH with consideration of the timing advance is not earlier than the first symbol (such as the starting position of the first symbol), it is determined that the target PUSCH meets the delay requirement, or when the starting position of the CPE of the first uplink symbol of the target PUSCH with consideration of the timing advance is earlier than the starting position of the first symbol, it is determined that the target PUSCH does not meet the delay requirement. As shown in the figure, the starting position of the scheduled target PUSCH is located at the symbol n+1, and symbols used for transmission of the PUSCH include symbols n+2, n+3 and n+4, where the cyclic prefix extension of the symbol n+2 is transmitted in the symbol n+1. In this example, it may be considered that the target PUSCH meets the delay requirement.

In an optional embodiment, the DCI includes downlink grant information, and the DCI schedules a PDSCH, and the terminal device determines whether the target uplink channel meets the processing delay according to an N1 processing time, the N1 processing time is a PDSCH decoding time.

In an implementation, the first symbol in the target uplink channel may include a CPE or may not include a CPE.

In an implementation, the terminal device receives the downlink grant DCI, and the DCI schedules transmission of the PDSCH, where the one-shot HARQ-ACK information request field in the DCI is a preset value, which is used to schedule the terminal device to transmit the target HARQ-ACK codebook through the target uplink channel, and the target codebook includes a Type-3 HARQ-ACK codebook. The terminal device determines whether the target uplink channel meets the processing delay according to the N1 processing time.

In an implementation, the terminal device receives the downlink grant DCI, and the DCI schedules transmission of the PDSCH, where the DCI is used to schedule the terminal device to transmit the target HARQ-ACK codebook through the target uplink channel, and the target codebook includes HARQ-ACK information corresponding to the PDSCH. The terminal device determines whether the target uplink channel meets the processing delay according to the N1 processing time.

In an implementation, where the terminal device transmits the target HARQ-ACK codebook to the network device through the target uplink channel after the delay requirement is met includes: after determining that a starting position of a first uplink symbol of the target uplink channel with consideration of influence of timing advance is not earlier than a second symbol, the terminal device transmits the target HARQ-ACK codebook to the network device through the target uplink channel, where the second symbol is a next uplink symbol after an end position of a last symbol of the PDSCH and a starting position of a CP of the second symbol is later than a third duration.

In an implementation, a unit of the third duration may include at least one of the following: sampling point, symbol, time slot, subframe, millisecond, and microsecond.

In an implementation, the second symbol corresponds to a symbol L1.

In an implementation, the third duration is determined according to the N1 processing time, and the N1 processing time is the PDSCH decoding time. Exemplarily, the third duration is T1, and T1 satisfies the above formula (3), where the value of $d_{1,1}$ is related to a mapping type of the PDSCH and a symbol length of the PDSCH.

Taking the target uplink channel being the target PUCCH as an example, the terminal device determines a target subcarrier spacing configuration $\mu$ according to a subcarrier spacing of the target PDCCH and a subcarrier spacing of the target PUCCH, and determines N1 corresponding to the target subcarrier spacing configuration $\mu$ according to the target subcarrier spacing configuration $\mu$ and the corresponding relationship between subcarrier spacings and N1 shown in Table 3 or Table 4. Then, T1 is obtained according to N1 and the above formula (3), the second symbol is determined according to T1, and whether the target PUCCH meets the delay requirement is determined according to the second symbol.

The second symbol is the next uplink symbol after the end position of the last symbol of the PDSCH scheduled by the DCI and the starting position of the CP of the second symbol is later than T1. After determining the second symbol, the terminal device judges whether the starting position of the target uplink channel, for example, the starting position of the first uplink symbol of the target PUCCH with consideration of the timing advance is earlier than the second symbol, when the starting position of the first uplink symbol of the target PUCCH with consideration of the timing advance is not earlier than the second symbol, the terminal device determines that the target PUCCH meets the delay requirement, or when the starting position of the first uplink symbol of the target PUCCH with consideration of the timing advance is earlier than the second symbol, the terminal device determines that the target PUCCH does not meet the delay requirement.

In an implementation, the starting position of the first uplink symbol of the target PUCCH with consideration of the timing advance includes: a starting position of the target PUCCH.

In an implementation, the starting position of the target uplink channel includes one of the following situation: a starting position of a CP of the first uplink symbol in the target uplink channel with consideration of the influence of timing advance; a starting position of a CPE of the first uplink symbol in the target uplink channel with consideration of the influence of timing advance.

Figure 5:
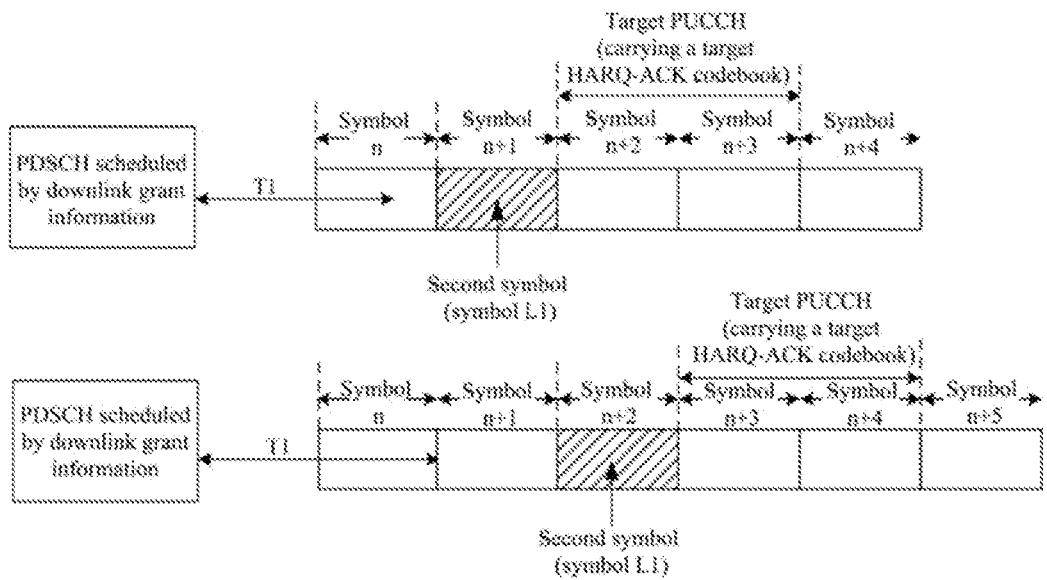
FIG. 5 is a schematic timing diagram of uplink scheduling when a processing delay of a PUCCH is determined according to N1.

FIG. 5 is a schematic timing diagram of uplink scheduling when a processing delay of a PUCCH is determined according to N1. As shown in FIG. 5, when the PDCCH carries the downlink grant information scheduling a PDSCH, after receiving the PDCCH, the terminal device determines the second symbol (or the symbol L1) according to the last symbol for transmitting the PDSCH and a T1 duration, where the second symbol is the next uplink symbol after the T1 duration starting from the end position of the last symbol of the PDSCH. T1 is determined according to N1.

In one example, an end position of T1 is located at a middle position of an uplink symbol n, therefore, the next uplink symbol after the T1 duration starting from the end position of the last symbol of the PDSCH is a symbol n+1, or in other words, the second symbol is the uplink symbol n+1. When the starting position of the first uplink symbol of the target PUCCH with consideration of the timing advance is not earlier than the second symbol, it is determined that the target PUCCH meets the delay requirement, or when the starting position of the first uplink symbol of the target PUCCH with consideration of the timing advance is earlier than the second symbol, it is determined that the target PUCCH does not meet the delay requirement. As shown in the figure, when the target PUCCH is transmitted on symbols n+2, and n+3, it may be considered that the target PUCCH meets the delay requirement.

In another example, the end position of T1 is located at an end position of the uplink symbol n, therefore, the next uplink symbol after the T1 duration starting from the end position of the last symbol of the PDSCH is the symbol n+2, or in other words, the second symbol is the uplink symbol n+2. When the starting position of the first uplink symbol of the target PUCCH with consideration of the timing advance is not earlier than the second symbol, it is determined that the target PUCCH meets the delay requirement, or when the starting position of the first uplink symbol of the target PUCCH with consideration of the timing advance is earlier than the second symbol, it is determined that the target PUCCH does not meet the delay requirement. As shown in the figure, when the target PUCCH is scheduled to transmit on symbols n+3 and n+4, it can be considered that the target PUCCH meets the delay requirement.

In some examples, when the end position of T1 is located at the end position of the uplink symbol n, the terminal device may determine the uplink symbol n+1 as the second symbol, and the present application does not exclude such a situation.

Figure 6:
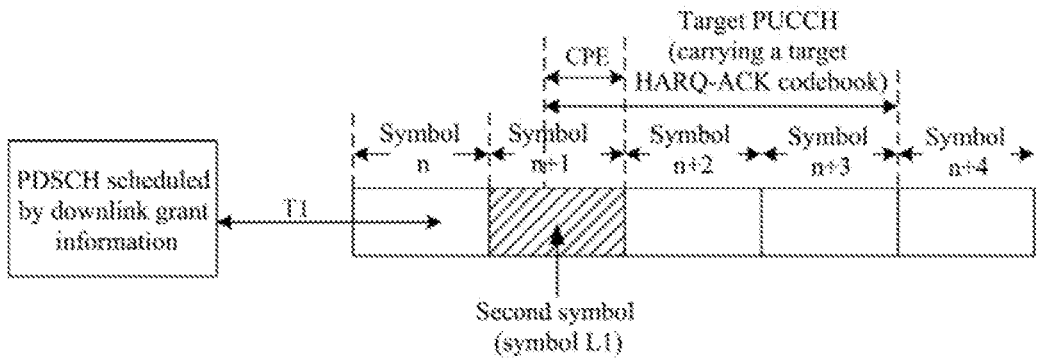
FIG. 6 is a schematic timing diagram of uplink scheduling when a processing delay of a PUCCH is determined according to N1.

FIG. 6 is a schematic timing diagram of uplink scheduling when a processing delay of a PUCCH is determined according to N1. As shown in FIG. 6, when a PDCCH carries downlink grant information scheduling a PDSCH, after receiving the PDCCH, the terminal device determines the second symbol (or the symbol L1) according to the last symbol of the PDSCH and the T1 duration, where the second symbol is the next uplink symbol after the T1 duration starting from the end position of the last symbol of the PDSCH. T1 is determined according to N1.

As shown in FIG. 6, the terminal device determines that the second symbol is the uplink symbol n+1. The first symbol in the target PUCCH indicated by the downlink grant information includes a CPE. When a starting position of the CPE of the first uplink symbol of the target PUCCH with consideration of the timing advance is not earlier than the second symbol (such as the starting position of the second symbol), it is determined that the target PUCCH meets the delay requirement, or when the starting position of the CPE of the first uplink symbol of the target PUCCH with consideration of the timing advance is earlier than the starting position of the second symbol, it is determined that the target PUCCH does not meet the delay requirement. As shown in the figure, the starting position of the indicated target PUCCH is located at the symbol n+1, and symbols used for transmission of the PUCCH include symbols n+2 and n+3, where the cyclic prefix extension of the symbol n+2 is transmitted in the symbol n+1. In this example, it may be considered that the target PUCCH meets the delay requirement.

In this embodiment, the network device instructs the terminal device to feed back the target HARQ-ACK codebook by carrying the one-shot HARQ-ACK request information used to instruct the terminal device to perform uplink feedback in the DCI. The terminal device transmits the target HARQ-ACK codebook to the network device through the target uplink channel after the delay requirement is met; or, when the delay requirement is not met, the terminal device does not transmit the target uplink channel, or the terminal device transmits the target uplink channel to the network device, but the target uplink channel does not include the valid target HARQ-ACK codebook. Through the method, processing delays of the one-shot HARQ-ACK information feedback (or processing delays of the uplink target channel used to feed back the one-shot HARQ-ACK information) when the DCI schedules the PDSCH and does not schedule the PDSCH can be determined, so as to ensure accurate transmission of the one-shot HARQ-ACK information.

Figure 7:
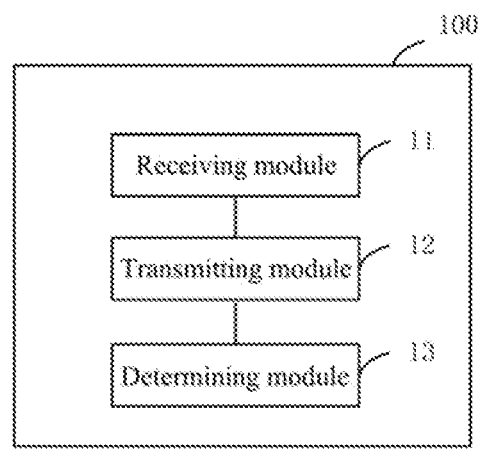
FIG. 7 is a schematic structural diagram of a terminal device provided in Embodiment 2 of the present application.

FIG. 7 is a schematic structural diagram of a terminal device provided in Embodiment 2 of the present application. As shown in FIG. 7, the terminal device 100 provided in this embodiment includes:

a receiving module 11, configured to receive downlink control information DCI transmitted by a network device, where the DCI includes one-shot hybrid automatic repeat-request-acknowledgement one-shot HARQ-ACK request information, the one-shot HARQ-ACK request information is used to instruct the terminal device to feed back a target HARQ-ACK codebook through a target uplink channel, and the DCI includes scheduling information of the terminal device;

a transmitting module 12, configured to transmit the target HARQ-ACK codebook to the network device through the target uplink channel after a delay requirement is met, or transmit to the network device the target uplink channel which does not include a valid target HARQ-ACK codebook when a delay requirement is not met, or, transmit the target HARQ-ACK codebook to the network device through the target uplink channel when the delay requirement is not met, where the target HARQ-ACK codebook includes at least part of invalid information; or, the terminal device 100 further includes a determining module 13, configured to determine not to transmit the target uplink channel when a delay requirement is not met.

In an implementation, the target uplink channel includes a target physical uplink control channel PUCCH or a target physical uplink shared channel PUSCH.

In an implementation, the scheduling information is used to schedule the terminal device for downlink reception or uplink transmission.

In an implementation, the DCI does not schedule a physical downlink shared channel PDSCH.

In an implementation, where the transmitting module 12 transmits the target HARQ-ACK codebook to the network device through the target uplink channel after the delay requirement is met includes: transmitting, by the terminal device, the target HARQ-ACK codebook to the network device through the target uplink channel after a first duration starting from a last symbol of a target physical downlink control channel PDCCH carrying the DCI, where the first duration is preset or configured by the network device.

In an implementation, the first duration includes N symbols, and N is an integer greater than 0.

In an implementation, the first duration includes one of the following conditions: when a target subcarrier spacing is 15 kHz, the first duration includes 10 symbols; or, when the target subcarrier spacing is 30 kHz, the first duration includes 12 symbols; or, when the target subcarrier spacing is 60 kHz, the first duration includes 22 symbols; or, when the target subcarrier spacing is 120 kHz, the first duration includes 25 symbols, where the target subcarrier spacing is a smaller subcarrier spacing of a subcarrier spacing of the target PDCCH and a subcarrier spacing of the target uplink channel; or, the target subcarrier spacing is a subcarrier spacing of the target PDCCH.

In an implementation, the first duration includes one of the following conditions: when a target subcarrier spacing is 15 kHz, the first duration includes 5 symbols; or, when the target subcarrier spacing is 30 kHz, the first duration includes 5.5 symbols; or, when the target subcarrier spacing is 60 kHz, the first duration includes 11 symbols; or, where the target subcarrier spacing is a smaller subcarrier spacing of a subcarrier spacing of the target PDCCH and a subcarrier spacing of the target uplink channel; or, the target subcarrier spacing is a subcarrier spacing of the target PDCCH.

In an implementation, the transmitting module transmits the target HARQ-ACK codebook to the network device through the target uplink channel after the delay requirement is met includes: transmitting the target HARQ-ACK codebook to the network device through the target uplink channel after determining that a starting position of a first uplink symbol of the target uplink channel with consideration of influence of timing advance is not earlier than the first symbol, and, where the first symbol is a next uplink symbol after an end position of a last symbol of a target PDCCH carrying the DCI and a starting position of a cyclic prefix CP of the next uplink symbol is later than a second duration.

In an implementation, the second duration is determined according to an N1 processing time.

In an implementation, the second duration is T1, and T1 satisfies the following formula:

$$T_1 = \max((N_1 + d_{1,1})(2048+144) \cdot \kappa 2^{-\mu} \cdot T_C;$$

where $\mu$ corresponds to one of ($\mu_{PDCCH}$, $\mu_{UL}$) that can determine a subcarrier spacing with a larger T1 value, $\mu_{PDCCH}$ corresponds to a subcarrier spacing of the target PDCCH, $\mu_{UL}$ corresponds to a subcarrier spacing of the target uplink channel, N1 is a processing time, and a value of $d_{1,1}$ is 0, $T_c = 1/(\Delta f_{max} \cdot N_f)$, $\Delta f_{max} = 480 \cdot 10^3$ Hz, $N_f = 4096$, $\kappa = 64$.

In an implementation, the second duration is determined according to the N2 processing time.

In an implementation, the second duration is T2, and T2 satisfies the following formula:

$$T_2 = \max((N_2 + d_{2,1})(2048+144) \cdot \kappa 2^{-\mu} \cdot T_C, d_{2,2});$$

where $\mu$ corresponds to one of ($\mu_{DL}$, $\mu_{UL}$) that can determine a subcarrier spacing with a larger T2 value, $\mu_{DL}$ corresponds to a subcarrier spacing of the target PDCCH, $\mu_{UL}$ corresponds to a subcarrier spacing of the target uplink channel, N2 is a processing time, and a value of $d_{2,1}$ is 0, if bandwidth part BWP switching occurs in the target uplink channel, then $d_{2,2}$ is equal to a switching time, otherwise $d_{2,2} = 0$, $T_c = 1/(\Delta f_{max} \cdot N_f)$, $\Delta f_{max} = 480 \cdot 10^3$ Hz, $N_f = 4096$, $\kappa = 64$.

In an implementation, the DCI schedules a PDSCH, and the transmitting module transmits the target HARQ-ACK codebook to the network device through the target uplink channel after the delay requirement is met includes: transmitting the target HARQ-ACK codebook to the network device through the target uplink channel after determining that a starting position of a first uplink symbol of the target uplink channel with consideration of influence of timing advance is not earlier than a second symbol, where the second symbol is a next uplink symbol after an end position of a last symbol of the PDSCH and a starting position of a cyclic prefix CP of the next uplink symbol is later than a third duration.

In an implementation, the third duration is determined according to an N1 processing time.

In an implementation, the third duration is T1, and T1 satisfies the following formula:

$$T_1 = (N_1 + d_{1,1})(2048+144) \cdot \kappa 2^{-\mu} \cdot T_C;$$

where $\mu$ corresponds to one of ($\mu_{PDCCH}$, $\mu_{UL}$) that can determine a subcarrier spacing with a larger T1 value, $\mu_{PDCCH}$ corresponds to a subcarrier spacing of the target PDCCH, $\mu_{UL}$ corresponds to a subcarrier spacing of the target uplink channel, N1 is a processing time, and a value of $d_{1,1}$ is determined according to a mapping type of the PDSCH and a symbol length of the PDSCH, $T_c = 1/(\Delta f_{max} \cdot N_f)$, $\Delta f_{max} = 480 \cdot 10^3$ Hz, $N_f = 4096$, $\kappa = 64$.

The terminal device provided by any optional implementation of this embodiment can be used to execute the corresponding method steps executed by the terminal device in the above method embodiment. Its implementation principle and technical effect are similar, and will not be repeated here, reference may be made to the description of the above method embodiments.

Figure 8:
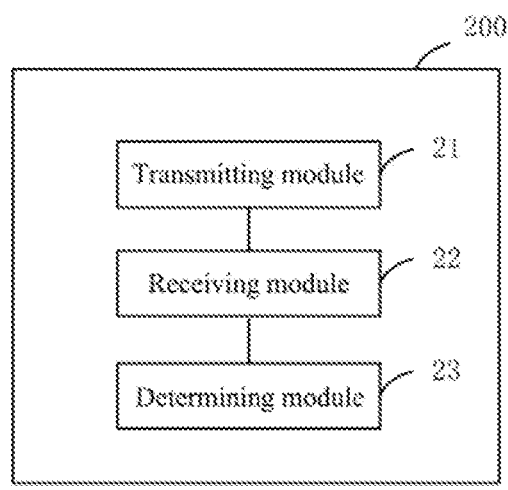
FIG. 8 is a schematic structural diagram of a network device provided in Embodiment 3 of the present application.

FIG. 8 is a schematic structural diagram of a network device provided in Embodiment 3 of the present application. As shown in FIG. 8, the network device 200 provided in this embodiment includes:

a transmitting module 21, configured to transmit downlink control information DCI to the terminal device, where the DCI includes one-shot hybrid automatic repeat-request-acknowledgement one-shot HARQ-ACK request information, the one-shot HARQ-ACK request information is used to instruct the terminal device to feed back a target HARQ-ACK codebook through a target uplink channel, and the DCI includes scheduling information of the terminal device;

a receiving module 22, configured to receive the target HARQ-ACK codebook transmitted by the terminal device through the target uplink channel when the target uplink channel meets a delay requirement, or receive the target uplink channel which does not include a valid target HARQ-ACK codebook when the target uplink channel does not meet a delay requirement, or receive the target HARQ-ACK codebook transmitted by the terminal device through the target uplink channel when the target uplink channel does not meet a delay requirement, where the target HARQ-ACK codebook includes at least part of invalid information;

a determining module 23, configured to determine not to receive the target uplink channel when the target uplink channel does not meet a delay requirement, or determine valid information and/or invalid information in the target HARQ-ACK codebook according to the delay requirement.

In an implementation, the target uplink channel includes a target physical uplink control channel PUCCH or a target physical uplink shared channel PUSCH.

In an implementation, the scheduling information is used to schedule the terminal device for downlink reception or uplink transmission.

In an implementation, the DCI does not schedule a physical downlink shared channel PDSCH.

In an implementation, a starting position of the target uplink channel is located after a first duration starting from a last symbol of a target physical downlink control channel PDCCH carrying the DCI, where the first duration is preset or configured by the network device.

In an implementation, the first duration includes N symbols, and N is an integer greater than 0.

In an implementation, the first duration includes one of the following conditions:

when a target subcarrier spacing is 15 kHz, the first duration includes 10 symbols; Or, when the target subcarrier spacing is 30 kHz, the first duration includes 12 symbols; or, when the target subcarrier spacing is 60 kHz, the first duration includes s 22 symbols; or, when the target subcarrier spacing is 120 kHz, the first duration includes 25 symbols, where the target subcarrier spacing is a smaller subcarrier spacing of a subcarrier spacing of the target PDCCH and a subcarrier spacing of the target uplink channel; or, the target subcarrier spacing is a subcarrier spacing of the target PDCCH.

In an implementation, the first duration includes one of the following conditions:

when a target subcarrier spacing is 15 kHz, the first duration includes 5 symbols; or, when the target subcarrier spacing is 30 kHz, the first duration includes 5.5 symbols; or, when the target subcarrier spacing is 60 kHz, the first duration includes 11 symbols; or, where the target subcarrier spacing is a smaller subcarrier spacing of a subcarrier spacing of the target PDCCH and a subcarrier spacing of the target uplink channel; or, the target subcarrier spacing is a subcarrier spacing of the target PDCCH.

In an implementation, a starting position of a first uplink symbol of the target uplink channel with consideration of influence of timing advance is not earlier than a first symbol;

where the first symbol is a next uplink symbol after an end position of a last symbol of a target PDCCH carrying the DCI and a starting position of a cyclic prefix CP of the next uplink symbol is later than a second duration.

In an implementation, the second duration is determined according to an N1 processing time.

In an implementation, the second duration is T1, and T1 satisfies the following formula:

$$T_1 = (N_1 + d_{1,1})(2048 + 144) \cdot \kappa 2^{-\mu} \cdot T_C;$$

where $\mu$ corresponds to one of $(\mu_{PDCCH}, \mu_{UL})$ that can determine a subcarrier spacing with a larger T1 value, $\mu_{PDCCH}$ corresponds to a subcarrier spacing of the target PDCCH, $\mu_{UL}$ corresponds to a subcarrier spacing of the target uplink channel, N1 is a processing time, and a value of $d_{1,1}$ is 0, $T_c = 1/(\Delta f_{max} \cdot N_f)$, $\Delta f_{max} = 480 \cdot 10^3$ Hz, $N_f = 4096$, $\kappa = 64$.

In an implementation, the second duration is determined according to the N2 processing time.

In an implementation, the second duration is T2, and T2 satisfies the following formula:

$$T_2 = \max((N_2 + d_{2,1})(2048 + 144) \cdot \kappa 2^{-\mu} \cdot T_C, d_{2,2});$$

where $\mu$ corresponds to one $(\mu_{DL}, \mu_{UL})$ that can determine a subcarrier spacing with a larger T2 value, $\mu_{DL}$ corresponds to a subcarrier spacing of the target PDCCH, $\mu_{UL}$ corresponds to a subcarrier spacing of the target uplink channel, N2 is a processing time, and a value of $d_{2,1}$ is 0, if bandwidth part BWP switching occurs in the target uplink channel, then $d_{2,2}$ is equal to switching time, otherwise $d_{2,2}=0$, $T_c=1/(\Delta f_{max} \cdot N_f)$, $\Delta f_{max}=480 \cdot 10^3$ Hz, $N_f=4096$, $\kappa=64$.

In an implementation, the DCI schedules a PDSCH, and a starting position of a first uplink symbol of the target uplink channel with consideration of influence of timing advance is not earlier than a second symbol; and where the second symbol is a next uplink symbol after an end position of a last symbol of the PDSCH and a starting position of a cyclic prefix CP of the next uplink symbol is later than a third duration.

In an implementation, the third duration is determined according to the N1 processing time.

In an implementation, the third duration is T1, and T1 satisfies the following formula:

$$T_1 = (N_1 + d_{1,1})(2048 + 144) \cdot \kappa 2^{-\mu} \cdot T_C;$$

where $\mu$ corresponds to one of $(\mu_{PDCCH}, \mu_{UL})$ that can determine a subcarrier spacing with a larger T1 value, $\mu_{PDCCH}$ corresponds to a subcarrier spacing of the target PDCCH, $\mu_{UL}$ corresponds to a subcarrier spacing of the target uplink channel, N1 is a processing time, and a value of $d_{1,1}$ is determined according to a mapping type of the PDSCH and a symbol length of the PDSCH, $T_c=1/(\Delta f_{max} \cdot N_f)$, $\Delta f_{max}=480 \cdot 10^3$ Hz, $N_f=4096$, $\kappa=64$.

The network device provided by any optional implementation of this embodiment is used to execute the corresponding method steps executed by the network device in the above method embodiment. Its implementation principle is similar to the technical effect and will not be repeated here, reference may be made to the description of the above method embodiments.

Figure 9:
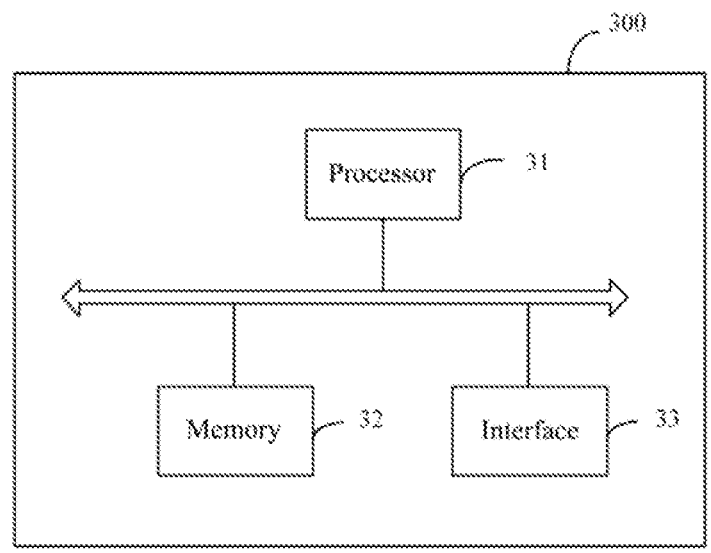
FIG. 9 is a schematic structural diagram of a terminal device provided in Embodiment 4 of the present application.

FIG. 9 is a schematic structural diagram of a terminal device provided in Embodiment 4 of the present application. As shown in FIG. 9, the terminal device 300 includes:

a processor 31, a memory 32, and an interface 33 for communicating with other devices;

the memory 32 stores a computer execution instruction;

the processor 31 executes the computer execution instruction stored in the memory, to enable the processor 31 executes the technical solution executed by the terminal device in any of the above method embodiments. Its implementation principle and technical effect are similar and will not be repeated here, reference may be made to the description of the above method embodiments.

FIG. 9 is a simple design of the terminal device. The embodiment of the present application does not limit the number of processors and memories in the terminal device. FIG. 9 only takes the number of 1 as an example.

Figure 10:
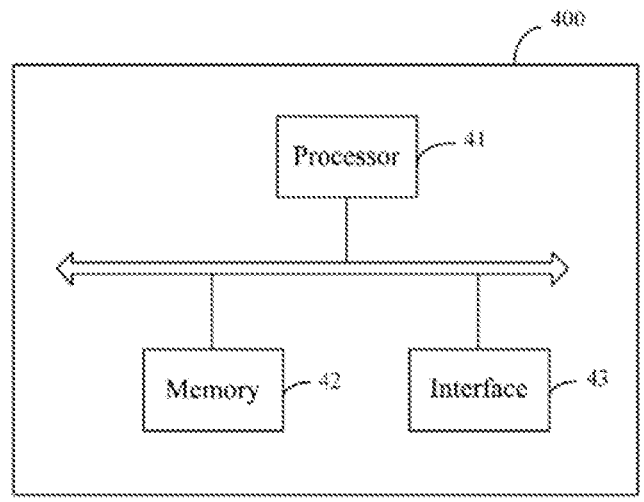
FIG. 10 is a schematic structural diagram of a network device provided in Embodiment 5 of the present application.

FIG. 10 is a schematic structural diagram of a network device provided in Embodiment 5 of the present application. As shown in FIG. 10, the network device 400 includes:

a processor 41, a memory 42, and an interface 43 for communicating with other devices;

the memory 42 stores a computer execution instruction;

the processor 41 executes the computer execution instruction stored in the memory to enable the processor 41 executes the technical solution executed by the network device in any of the above method embodiments. Its implementation principle and technical effect are similar and will not be repeated here, reference may be made to the description of the above method embodiments.

FIG. 10 is a simple design of a network device. The embodiment of the present application does not limit the number of processors and memories in the network device. FIG. 10 only takes the number of 1 as an example.

In a specific implementation of the terminal device or the network device shown in the above embodiment, the memory, the processor and the interface may be connected through a bus, and in an implementation, the memory may be integrated inside the processor.

The embodiment of the present application also provides a computer-readable storage medium, where a computer execution instruction is stored in the computer-readable storage medium, and when the computer execution instruction is executed by the processor, the technical solution executed by the terminal device in any of the above method embodiments is implemented.

The embodiment of the present application also provides a computer-readable storage medium, where a computer execution instruction is stored in the computer-readable storage medium, and when the computer execution instruction is executed by the processor, the technical solution executed by the network device in any of the above method embodiments is implemented.

The embodiment of the present application also provides a program for executing the technical solution executed by the terminal device in any of the above method embodiments when the program is executed by a processor.

The embodiment of the present application also provides a program for executing the technical solution executed by the network device in any of the above method embodiments when the program is executed by a processor.

In an implementation, the processor may be a chip.

The embodiment of the present application also provides a computer program product, including a program instruction, where the program instruction is used to implement the technical solution executed by the terminal device in any of the above method embodiments.

The embodiment of the present application also provides a computer program product, including a program instruction, where the program instruction is used to implement the technical solution executed by the network device in any of the above method embodiments.

An embodiment of the present application also provides a chip, including a processing module and a communication interface, where the processing module can execute the technical solution executed by the terminal device in any of the above method embodiments.

Further, the chip also includes a storage module (e.g., a memory), where the storage module is used to store an instruction, the processing module is used to execute the instruction stored in the storage module, and an execution of the instruction stored in the storage module causes the processing module to execute the technical solution executed by the terminal device in any of the above method embodiments.

An embodiment of the present application also provides a chip, including a processing module and a communication interface, where the processing module can execute the technical solution executed by the network device in any of the above method embodiments.

Further, the chip also includes a storage module (e.g., a memory), where the storage module is used to store an instruction, the processing module is used to execute the instruction stored in the storage module, and an execution of the instructions stored in the storage module causes the processing module to execute the technical solution executed by the network device in any of the above method embodiments.

In several embodiments provided in the present application, it should be understood that disclosed devices and methods may be implemented in other manners. For example, the device embodiment described above is only illustrative. For example, a division of the module is only a logical function division, and there may be another division mode in actual implementation. For example, multiple modules may be combined or integrated into another system, or some features may be ignored or not executed. On the other hand, the mutual coupling or direct coupling or communication connection shown or discussed may be through some interfaces, indirect coupling or communication connection of modules may be electrical, mechanical or in other forms.

In the specific implementation of the above network device and terminal device, it should be understood that the processor may be a central processing unit (CPU), or other general-purpose processors and a digital signal processor (DSP), and an application specific integrated circuit (ASIC), etc. The general-purpose processor may be a microprocessor or a processor may also be any conventional processor, etc. The steps in combination with the method disclosed in the present application may be directly embodied as executed by a hardware processor, or executed by a combination of hardware and software modules in the processor.

All or part of the steps for implementing the above method embodiments may be completed by a hardware related to a program instruction. The aforementioned program may be stored in a readable memory. When the program is executed, the steps including the above method embodiments are executed; and the aforementioned memory (storage medium) includes a read-only memory (ROM), an random access memory (RAM), a flash memory, a hard disk, a solid-state hard disk, a magnetic tape, a floppy disk, an optical disc and any combination thereof.

What is claimed is:

1. An information transmission method, comprising:
receiving, by a terminal device, downlink control information (DCI) transmitted by a network device, wherein the DCI comprises one-shot hybrid automatic repeat-request-acknowledgement (one-shot HARQ-ACK) request information, the one-shot HARQ-ACK request information is used to instruct the terminal device to feed back a target HARQ-ACK codebook through a target uplink channel, and the DCI comprises scheduling information of the terminal device, wherein the DCI does not schedule a physical downlink shared channel (PDSCH);
transmitting, by the terminal device, the target HARQ-ACK codebook to the network device through the target uplink channel after a first duration starting from a last symbol of a target physical downlink control channel (PDCCH) carrying the DCI, wherein the first duration is preset;
wherein the first duration comprises one of the following conditions:
when a target subcarrier spacing is 15 kHz the first duration comprises 10 symbols; or
when the target subcarrier spacing is 30 kHz, the first duration comprises 12 symbols; or,
when the target subcarrier spacing is 60 kHz, the first duration comprises 22 symbols, wherein the target subcarrier spacing is a smaller subcarrier spacing of a subcarrier spacing of the target PDCCH and a subcarrier spacing of the target uplink channel; or
wherein the first duration comprises one of the following conditions:
when a target subcarrier spacing is 15 kHz, the first duration comprises 5 symbols; or,
when the target subcarrier spacing is 30 kHz, the first duration comprises 5.5 symbols; or,
when the target subcarrier spacing is 60 kHz, the first duration comprises 11 symbols, wherein the target subcarrier spacing is a smaller subcarrier spacing of a subcarrier spacing of the target PDCCH and a subcarrier spacing of the target uplink channel.

2. The method according to claim 1, wherein the target uplink channel comprises a target physical uplink control channel (PUCCH) or a target physical uplink shared channel (PUSCH).

3. An information transmission method, comprising:
transmitting, by a network device, downlink control information (DCI) to a terminal device, wherein the DCI comprises one-shot hybrid automatic repeat-request-acknowledgement (one-shot HARQ-ACK) request information, the one-shot HARQ-ACK request information is used to instruct the terminal device to feed back a target HARQ-ACK codebook through a target uplink channel, and the DCI comprises scheduling information of the terminal device, wherein the DCI does not schedule a physical downlink shared channel (PDSCH);
receiving, by the network device, the target HARQ-ACK codebook transmitted by the terminal device through the target uplink channel, wherein a starting position of the target uplink channel is located after a first duration starting from a last symbol of a target physical downlink control channel (PDCCH) carrying the DCI wherein the first duration is preset;
wherein the first duration comprises one of the following conditions:
when a target subcarrier spacing is 15 kHz, the first duration comprises 10 symbols; or,
when the target subcarrier spacing is 30 kHz, the first duration comprises 12 symbols; or
when the target subcarrier spacing is 60 kHz the first duration comprises 22 symbols, wherein the target subcarrier spacing is a smaller subcarrier spacing of a subcarrier spacing of the target PDCCH and a subcarrier spacing of the target uplink channel; or
wherein the first duration comprises one of the following conditions:
when a target subcarrier spacing is 15 kHz, the first duration comprises 5 symbols: or
when the target subcarrier spacing is 30 KHz, the first duration comprises 5.5 symbols; or,
when the target subcarrier spacing is 60 kHz, the first duration comprises 11 symbols wherein the target subcarrier spacing is a smaller subcarrier spacing of a subcarrier spacing of the target PDCCH and a subcarrier spacing of the target uplink channel.

4. The method according to claim 3, wherein the target uplink channel comprises a target physical uplink control channel (PUCCH) or a target physical uplink shared channel (PUSCH).

5. A network device, comprising:
a processor, a memory and an interface for communication with a terminal device;
the memory stores a computer execution instruction;
the processor executes the computer execution instruction stored in the memory to enable the processor to execute the communication method according to claim 3.

6. A terminal device, comprising:
a processor, a memory and an interface for communication with a terminal device;
the memory stores a computer execution instruction;
the processor executes the computer execution instruction stored in the memory to enable the processor to:
control an input interface to receive downlink control information (DCI) transmitted by a network device, wherein the DCI comprises one-shot hybrid automatic repeat-request-acknowledgement (one-shot HARQ-ACK) request information, the one-shot HARQ-ACK request information is used to instruct the terminal device to feed back a target HARQ-ACK codebook through a target uplink channel, and the DCI comprises scheduling information of the terminal device, wherein the DCI does not schedule a physical downlink shared channel (PDSCH);
control an output interface to transmit the target HARQ-ACK codebook to the network device through the target uplink channel after a first duration starting from a last symbol of a target physical downlink control channel (PDCCH) carrying the DCI, wherein the first duration is preset;
wherein the first duration comprises one of the following conditions:
when a target subcarrier spacing is 15 kHz, the first duration comprises 10 symbols; or,
when the target subcarrier spacing is 30 kHz, the first duration comprises 12 symbols: or, when the target subcarrier spacing is 60 kHz, the first duration comprises 22 symbols, wherein the target subcarrier spacing is a smaller subcarrier spacing of a subcarrier spacing of the target PDCCH and a subcarrier spacing of the target uplink channel; or wherein the first duration comprises one of the following conditions:

when a target subcarrier spacing is 15 kHz, the first duration comprises 5 symbols; or when the target subcarrier spacing is 30 kHz, the first duration comprises 5.5 symbols; or, when the target subcarrier spacing is 60 kHz the first duration comprises 11 symbols, wherein the target subcarrier spacing is a smaller subcarrier spacing of a subcarrier spacing of the target PDCCH and a subcarrier spacing of the target uplink channel.

7. The device according to claim 6, wherein the target uplink channel comprises a target physical uplink control channel (PUCCH) or a target physical uplink shared channel PUSCH.

* * * * *